(12) United States Patent
Onnerud et al.

(10) Patent No.: US 10,784,492 B2
(45) Date of Patent: Sep. 22, 2020

(54) LOW PROFILE PRESSURE DISCONNECT DEVICE FOR LITHIUM ION BATTERIES

(71) Applicant: Cadenza Innovation, Inc., Wilton, CT (US)

(72) Inventors: Tord Per Jens Onnerud, Wilton, CT (US); Jay Jie Shi, Acton, MA (US)

(73) Assignee: Cadenza Innovation, Inc., Wilton, CT (US)

( * ) Notice: Subject to any disclaimer, the term of this patent is extended or adjusted under 35 U.S.C. 154(b) by 0 days.

(21) Appl. No.: 15/562,792

(22) PCT Filed: Dec. 14, 2016

(86) PCT No.: PCT/US2016/066663
§ 371 (c)(1),
(2) Date: Sep. 28, 2017

(87) PCT Pub. No.: WO2017/106349
PCT Pub. Date: Jun. 22, 2017

(65) Prior Publication Data
US 2018/0287127 A1   Oct. 4, 2018

Related U.S. Application Data

(60) Provisional application No. 62/395,050, filed on Sep. 15, 2016, provisional application No. 62/266,813, filed on Dec. 14, 2015.

(51) Int. Cl.
*H01M 2/34* (2006.01)
*H01M 2/02* (2006.01)
(Continued)

(52) U.S. Cl.
CPC .......... *H01M 2/345* (2013.01); *B60L 3/0046* (2013.01); *B60L 50/64* (2019.02); *B60L 58/26* (2019.02);
(Continued)

(58) Field of Classification Search
CPC .... H01M 2/345; H01M 2/0237; H01M 2/043; H01M 2/1077; H01M 2/1094; H01M 2/206; H01M 2/348
See application file for complete search history.

(56) References Cited

U.S. PATENT DOCUMENTS 5,741,606 A   4/1998 Mayer et al.
6,746,795 B2   6/2004 Schwarz
(Continued)

FOREIGN PATENT DOCUMENTS

WO   WO 2015/179625   11/2015
WO   WO 2014/059348   4/2017
WO   WO 2017/106349   6/2017

OTHER PUBLICATIONS

Crane, J.F.W, the Use of Woollen Felt Screens as Air Cleaners for Supersonic Wind Tunnels, Ministry of Aviation, Aeronautical Research Council Current Papers, C.P. No. 538 (1961).
(Continued)

*Primary Examiner* — Osei K Amponsah
(74) *Attorney, Agent, or Firm* — McCarter & English, LLP

(57) ABSTRACT

Casings for lithium ion batteries are provided that include a container or assembly that defines a base, side walls and a top or lid, and a vent structure associated with the container or assembly. A flame arrestor may be positioned in proximity to the vent structure. The lithium ion battery may also include a pressure disconnect device associated with the casing. The pressure disconnect device may include a deflectable dome-based activation mechanism, and the deflectable dome-based activation mechanism may be configured and dimensioned to prevent burn through, e.g., by increasing the mass of the dome-based activation mechanism, adding material (e.g., foil) to the dome-based activation mechanism, and combinations thereof. Burn through may also be avoided, at least in part, based on the speed at which the dome-based activation mechanism responds at a target trigger pressure.

15 Claims, 15 Drawing Sheets

(51) Int. Cl.
*H01M 2/04* (2006.01)
*H01M 2/10* (2006.01)
*H01M 2/20* (2006.01)
*H01M 10/0525* (2010.01)
*B60L 3/00* (2019.01)
*B60L 58/26* (2019.01)
*B60L 50/64* (2019.01)

(52) U.S. Cl.
CPC ......... *H01M 2/0237* (2013.01); *H01M 2/043* (2013.01); *H01M 2/1077* (2013.01); *H01M 2/1094* (2013.01); *H01M 2/206* (2013.01); *H01M 2/348* (2013.01); *H01M 10/0525* (2013.01); *B60L 2240/545* (2013.01); *H01M 2200/103* (2013.01); *H01M 2200/20* (2013.01); *Y02T 10/705* (2013.01); *Y02T 10/7011* (2013.01)

(56) References Cited

U.S. PATENT DOCUMENTS

| | | | |
|---|---|---|---|
| 8,440,336 B2 | 5/2013 | Byun | |
| 8,580,426 B2 | 11/2013 | Kim | |
| 8,748,030 B2 | 6/2014 | Byun | |
| 8,753,765 B2 | 6/2014 | Byun et al. | |
| 8,877,361 B2 | 11/2014 | Byun et al. | |
| 9,023,498 B2 | 5/2015 | Kim et al. | |
| 9,054,371 B2 | 6/2015 | Guen | |
| 9,172,079 B2 | 10/2015 | Han et al. | |
| 9,246,140 B2 | 1/2016 | Kim et al. | |
| 9,312,565 B2 | 4/2016 | Kim | |
| 9,685,644 B2 | 6/2017 | Lampe-Onnerud et al. | |
| 2002/0001754 A1* | 1/2002 | Satoh | H01M 10/0431 429/303 |
| 2012/0121949 A1* | 5/2012 | Eberhard | H01M 2/105 429/82 |
| 2014/0272491 A1 | 9/2014 | Kohlberger | |
| 2015/0295221 A1* | 10/2015 | Urano | H01M 2/22 429/61 |

OTHER PUBLICATIONS

PCT Search Report and Written Opinion of PCT/US2016/06663, dated May 10, 2017.
PCT/US2016/06663, filed Dec. 14, 2016, WO 2017/106349.
U.S. Appl. No. 62/395,050, filed Sep. 15, 2016.
U.S. Appl. No. 62/266,813, filed Dec. 14, 2015.

* cited by examiner

LOW PROFILE PRESSURE DISCONNECT DEVICE FOR LITHIUM ION BATTERIES

CROSS-REFERENCE TO RELATED APPLICATIONS

The present application claims priority benefit to two (2) U.S. provisional patent applications, as follows: (i) U.S. provisional patent application entitled "Current Interrupt and Vent Systems for Lithium Ion Batteries," which was filed on Dec. 14, 2015, and assigned Ser. No. 62/266,813, and (ii) U.S. provisional patent application entitled "Current Vent/Pressure Disconnect Device System for Lithium Ion Batteries," which was filed on Sep. 15, 2016, and assigned Ser. No. 62/395,050. The entire contents of the foregoing provisional patent applications are incorporated herein by reference.

In addition, the present application is directed to lithium ion battery technology that is related to and draws upon features and functions described in previous patent filings. In particular, the present application is related to the subject matter disclosed in (i) a PCT application entitled "Lithium Ion Battery," which was filed on Nov. 1, 2013, and assigned Serial No. PCT/US2013/064654 (republished as WO 2014/059348 on Aug. 27, 2015), and (iii) a PCT application entitled "Lithium Ion Battery with Thermal Runaway Protection," filed on May 21, 2015, and assigned Serial No. PCT/US2015/031948. The entire contents of the foregoing PCT applications and their underlying provisional patent applications are incorporated herein by reference.

GOVERNMENT RIGHTS

This invention was made with government support under DE-AR0000392 awarded by the United States Department of Energy. The government has certain rights in the invention.

FIELD OF DISCLOSURE

The present disclosure relates to lithium ion batteries and, more particularly, to multi-core lithium ion batteries having improved safety and reduced manufacturing costs.

BACKGROUND

Li-ion cells were initially deployed as batteries for laptops, cell phones and other portable electronics devices. Recently, an increase in larger applications, such as battery electric vehicles (BEV), Plug-in Hybrid Electric Vehicles (PHEV), and Hybrid Electric Vehicles (HEV), electric trains, as well as other larger format systems, such as grid storage (GRID), construction, mining and forestry equipment, forklifts, other driven applications and lead acid replacement (LAR), are entering the market due to the need for lowering of emissions and lowering of gasoline and electricity costs, as well as limiting emissions. A wide variety of Li-ion cells are deployed today in these larger battery applications ranging from use of several thousand of smaller cylindrical and prismatic cells, such as 18650 and 183765 cells, ranging in capacity from 1 Ah to 7 Ah, as well as a few to a few hundred larger cells, such as prismatic or polymer cells having capacities ranging from 15 Ah to 100 Ah. These type of cells are produced by companies such as Panasonic, Sony, Sanyo, ATL, JCI, Boston-Power, SDI, LG Chemical, SK, BAK, BYD, Lishen, Coslight and other Li-ion cell manufacturers.

In general, the industry needs to drive to higher energy density in order to achieve longer run time, which for electrified vehicles leads to increased electric range and for grid storage systems translates to longer and more cost effective deployment. In the case of electrified vehicles, and in particular BEVs and PHEVs, an increased energy density leads to an ability to increase driving range of the vehicle, as more capacity can fit into the battery box. The higher energy density also leads to an ability to lower cost per kWh, as the non-active materials, such as the battery box, wiring, BMS electronics, fastening structures, cooling systems, and other components become less costly per kWh. Similarly, for other battery systems, such as grid storage, there is a market need for higher energy density in particular for peak shaving applications (i.e., applications that support reductions in the amount of energy purchased from utilities during peak hours when the charges are highest). Also, cost per kWh is less for high energy density as relatively less real estate and inactive components per kWh can be used. In addition, for highly populated areas, such as the metropolitan areas of New York, Tokyo, Shanghai and Beijing, the sizes of systems need to be minimized There is a need to fit the battery systems into commercial and residential buildings and containers to contribute to grid peak power reduction strategies, leading to lower electricity cost and reduction of peaker plants (i.e., power plants that run only when there is a high demand for electricity) that operate with low efficiency.

Li-ion batteries serving these type of needs must become less costly and of higher energy density to be competitive in the market place when compared to other battery and power delivering technologies. However, as Li-ion cells are packaged more densely, there is a risk that a failure of one cell from abuse may lead to propagating (cascading) runaway in the entire system, with a risk of explosion and fire. This abuse can come from external events, such as crash and fire, and also from internal events, such as inadvertent overcharge due to charging electronics failures or internal shorts due to metal particulates from the manufacturing process.

There is a need to find new solutions where abuse failures do not lead to cascading runaway, and to thereby enable systems of higher energy density and lower cost. A cell having reliable non-cascading attributes will enable lower battery pack costs, at least in part based on a reduction in costly packaging structures.

A number of solutions have been used in the past for Li-ion cells to mitigate the noted cascading issues:
1. Vent structures for exhausting flammable gasses and releasing pressure build up inside the cell.
2. Overcharge disconnect devices or pressure safety devices (also called current interrupt devices, CIDs), triggered by high internal pressure where a mechanical frustrum disconnects a cell that has been charged beyond its electrochemical voltage window that can result in the creation/release of flammable gasses that increase cell internal pressure.
3. Separation of cells by distance or fire protecting barriers, such as intumescent coatings, plastics filled with fire retardants, or ceramic structures.
4. Extinguishing systems triggered by heat or smoke Different venting technologies have been disclosed. Most methods are based on scoring the metal lid to allow for an opening to occur in the metal housing to release the overpressure in the container in a controlled way to avoid catastrophic failure of joints or even rupture of walls at uncontrolled container locations. Different score geometries have been used and/or disclosed: e.g., a linear score, a dog bone shaped score or a near full circular score. Such score lines are frequently placed in a location of the container surface where, for this purpose, the gauge section has been reduced mechanically or chemically to form a diaphragm-type structure.

A large opening is prone to flashback of a venting flame, which can result in ignition of the entire cell. Small vent openings contribute to further risks that should be avoided. For example, high gas velocities which occur from a partially opened vent can result in atomization of the escaping Li-ion cell electrolyte, forming a highly reactive gas stream. Venting pressures are commonly in the 10 to 15 bar range. There is a need to reduce the risk of flashback during venting, thereby minimizing the risk of fire/explosion of the system.

Beyond the vent technologies discussed above, a number of pressure disconnect designs are used and/or disclosed for use in Li-ion batteries. If lithium-ion battery cell are charged beyond the maximum permissible voltage, there is the potential for damage to the cell and, in certain instances, there is the potential for catastrophic results, e.g., thermal runaway that can lead to battery explosion and/or fire. Previously disclosed devices are generally pressure triggered metal structures, such as an inversion dome, which upon overcharge disrupts the current path internally before the vent structure opens. This current path disruption prevents additional charging of the electrode structures and gassing is stopped.

The industry has evaluated designs that incorporate fuse-based technology to control the potential fall-out from overcharge situations. However, fuses associated with prior art overcharge safety devices have been positioned internal to the housing of the lithium ion battery. See, e.g., U.S. Patent Publication No. 2014/0272491 to Kohlberger. Internal positioning of the fuse is disadvantageous for multi-core battery designs of the type disclosed herein because, inter alia, overcharge disruption at an individual core may be ineffective to avoid thermal runaway and other undesirable fall-out from an overcharge situation.

For some of these solutions to work well for Li-ion batteries, so-called gassing additives, such as CHB (cyclohexylbenzene) and BP (biphenyl), are added, which produces gas at lower voltages than other electrolyte components and can trigger the disconnect before the cell is electrochemically made instable due to the increased reactivity of the chemical system upon higher state of charge.

The noted pressure disconnect methods work particularly well for smaller cells, which are generally characterized by container structures that can survive higher pressures without risk of leakage. For large Li-ion cells, the pressure disconnect needs to operate at a lower pressure to limit the risk of explosive failure.

There is a need to limit the expansion of the cell container, as any such expansion could prematurely open the cell. Any premature opening of the cell, e.g., opening at seal locations or around feedthrough terminals, would fail the device and also gas leakage would be a fire hazard. In particular, as the cell is expanding, premature vent opening due to mechanical expansion fatigue of the vent can occur. As a result, in current designs, the industry has positioned the vent on the lowest area face of the prismatic can, such as welded lid, where expansion is the most limited, and such lid structures are typically very thick and welded onto the can due to the relatively high pressure caused inside the cell container during abuse. Thus, there is a need to find solutions that allow positioning of the vent on the large area side of a can in certain applications, e.g., to allow for directional flexibility of the venting action.

The present disclosure provides advantageous designs that address the needs and shortcomings outlined above. Additional features, functions and benefits of the disclosed battery systems will be apparent from the description which follows, particularly when read in conjunction with the appended figure(s), examples and experimental data.

SUMMARY

Advantageous casings for lithium ion batteries are provided that include, inter alia, (i) a container or assembly that defines a base, side walls and a top or lid for receiving electrochemical units, and (ii) a pressure disconnect device associated with the container or assembly. The disclosed pressure disconnect device advantageously electrically isolates electrochemical units associated with the lithium ion battery in response to a build up of pressure within the container that exceeds a predetermined pressure threshold. The disclosed container may also advantageously include a vent structure that functions to release pressure from within the container, and a flame arrestor positioned in proximity to the vent structure.

In exemplary embodiments of the present disclosure, a casing for a lithium ion battery is provided that includes, inter alia, (i) a container/assembly that defines a base, side walls and a top or lid, (ii) a deflectable dome structure associated with the container/assembly, and (iii) a fuse assembly positioned external to the container/assembly that is adapted, in response to a pressure build-up within the container/assembly beyond a threshold pressure level, to electrically isolate lithium ion battery components positioned within the container. The fuse assembly may include a fuse that is positioned within a fuse holder positioned external to the container. The fuse holder may be mounted with respect to a side wall of the container/assembly. The disclosed casing may further include a vent structure formed adjacent to the fuse assembly with respect to the side wall of the container and/or a flame arrestor positioned adjacent the vent structure.

In exemplary embodiments of the present disclosure, the deflectable dome is mounted directly to the casing. More particularly, the deflectable dome is mounted internal of an opening formed in the casing (either the base, side wall or top/lid thereof) and is initially bowed into the internal volume defined by the casing relative to the casing face to which it is mounted. The fuse assembly that is mounted with respect to an external face of the casing advantageously includes a hammer or other structural feature that is aligned with the center line of the deflectable dome to facilitate electrical communication therebetween when the deflectable dome is actuated by a pressure build up within the casing.

The deflectable dome may advantageously include a thickness profile whereby the deflectable dome defines a greater thickness at and around the centerline of the dome, and a lesser thickness radially outward thereof. The greater thickness at and around the centerline of the dome provides a preferred electrical communication path between the deflectable dome and the disclosed hammer or other structural feature, i.e., when the deflectable dome is actuated by an increased pressure within the casing. The lesser thickness that exists radially outward of the thicker region defined by the deflectable dome reduces the likelihood of arcing from such reduced thickness regions to the hammer or other structural feature. The dome should further be triggered at as low pressure as possible and preferably move quickly once activated to provide highest safety. Of further note, the greater thickness at and around the centerline of the deflectable dome advantageously reduces the likelihood of burn through as the current passes between the deflectable dome and the hammer or other structural feature associated with the fuse assembly.

The disclosed pressure disconnect device of the present disclosure is most advantageously implemented with a multi-core lithium ion battery assembly of the type disclosed in commonly assigned US Patent Publication No. 2015/0280185 to Lampe-Onnerud et al. The content of the foregoing '185 publication is incorporated by reference herein. In particular, it is noted that the multiple lithium ion cores (i.e., electrochemical units) are positioned in distinct cavities defined by a support member, but are not individually sealed. Rather, each of the electrochemical units is open and in communication with a shared atmosphere region defined within the case/container. As a result, any pressure build up that might be associated with a single electrochemical unit is translated to the shared atmosphere region and the increase in pressure is thereby mitigated. In such way, a pressure disconnect device of the present disclosure—which is advantageously in pressure communication with the shared atmosphere region—may, due to its larger size compared to being mounted on an individual electrochemical unit, be operational at a lower threshold pressure as compared to conventional lithium ion battery systems that do not include a shared atmosphere region in the manner disclosed in the '185 publication.

Still further, the multi-core lithium ion battery design of the '185 publication advantageously permits the deflectable dome to be larger in size because the shared atmosphere region is generally abutted by a large area of the casing, and the deflectable dome may be sized to overlay an opening formed in such large area of the casing to effectively respond to a pressure build-up within the casing. A larger deflectable dome is desirable because, inter alia, it may be thicker without sacrificing pressure responsiveness.

The pressure at which the pressure disconnect device of the present disclosure is activated is generally dependent on the overall design of the lithium ion battery. However, the threshold pressure within the casing which activates the disclosed pressure disconnect device is generally 10 psig or greater, and is generally in the range of 10-40 psig. In embodiments that also include a vent structure, the pressure at which the vent structure is activated to vent, i.e., release pressurized gas from the casing, is generally at least 5 psig greater than the pressure at which the pressure disconnect device is activated. The overall pressure rating of the casing itself, i.e., the pressure at which the casing may fail, is generally set at a pressure of at least 5 psig greater than the pressure at which the vent structure is activated. The pressure rating of the casing has particular importance with respect to interface welds and other joints/openings that include sealing mechanisms where failures are more likely to occur.

In exemplary pressure disconnect devices of the present disclosure, the hammer or other structural element is mounted with respect to the fuse assembly in a mounting plane, and includes a portion that advantageously extends toward the deflectable dome relative to the mounting plane. In this way, the travel distance required for the deflectable dome is reduced when it is desired that the pressure disconnect device be activated. The hammer or other structural element is generally fixedly mounted relative to a mounting plane of the fuse assembly in at least two spaced locations.

For example, the hammer or other structural device may define a substantially U-shaped geometry, thereby bringing the hammer into closer proximity with the deflectable dome. The centerline of the U-shaped geometry of the hammer or other structure is generally aligned with the centerline of the deflectable dome, and thereby defines a preferred region of contact when the deflectable dome is actuated by a build up in pressure within the casing.

In exemplary embodiments, the deflectable dome is mounted internal to a plane defined by the casing (e.g., the base, side wall or top/lid of the casing) and the hammer or other structural member is mounted external to the plane defined by the casing. However, the hammer or other structural element defines a geometry, e.g., a U-shaped geometry, that extends across the planed defined by the casing and is thereby positioned at least in part internal to such plane. Although a U-shaped geometry for the hammer or other structural element is specifically contemplated, alternative geometries may also be employed, e.g., a parabolic geometry, a saw-tooth geometry with a substantially flattened contact region, or the like.

Turning to the vent structure that may be provided in exemplary embodiments of the present disclosure, the vent structure may be defined by a score line. A flame arrestor may be advantageously mounted with respect to the container/assembly so as to extend across an area defined by the vent structure internal to the container/assembly. In exemplary embodiments, the flame arrestor may take the form of a mesh structure, e.g., a 30 US mesh. In other exemplary embodiments, the flame arrestor may be fabricated from copper wire.

The vent structure of the present disclosure may be adapted to vent in response to a vent pressure of between about 10 psi and 140 psi. The structural limit pressure of the container (P4) may be at least about ten percent greater than the vent pressure.

The disclosed lithium ion battery components may be designed use in a variety of applications, e.g., in a battery electric vehicle (BEV), a plug-in hybrid electric vehicle (PHEV), a hybrid electric vehicle (HEY), electric trains, grid storage (GRID), construction, mining, garden, and forestry equipment, forklifts, lead acid replacement (LAR) and other battery-supported devices and systems that typically use multiple lithium ion cells.

In further exemplary embodiments of the present disclosure, a casing for a lithium ion battery is provided that includes, inter alia, (i) a container/assembly that defines a base, side walls and a top or lid; (ii) a vent structure defined with respect to the container/assembly, and (iii) a flame arrestor mounted with respect to the container/assembly so as to overlap the vent structure, wherein when the flame arrestor is configured and dimensioned to reduce the temperature of an exiting gas stream below its auto-ignition temperature, and/or permit relatively free passage of the exiting gas stream through the flame arrestor so as to substantially avoid back pressure associated with discharge of the exiting gas stream therethrough.

The disclosed vent structure may be formed or positioned adjacent to the pressure disconnect device with respect to an exterior face of the casing, e.g., the base, one of the side walls or the top/lid of the casing. However, in other exemplary embodiments of the present disclosure, the vent structure and the pressure disconnect device may be mounted with respect to different exterior faces of the casing. Thus, for example, the vent structure may be mounted with respect to the top/lid casing while the pressure disconnect device is mounted with respect to a side wall (or vice versa).

Enhanced flexibility in positioning of the vent structure and the pressure disconnect device is facilitated for lithium ion battery designs of the type disclosed in the of the '185 publication to Lampe-Onnerud, which features a shared atmosphere region as discussed above. The vent structure may be centrally located with respect to the exterior surface of the top cover or lid of the container/assembly. A flame arrestor may be positioned adjacent the vent structure.

In alternative embodiments, a vent structure, or multiple vents, may be located or positioned on the surface opposite the exterior surface of the top cover or lid of the container/assembly, or on such other surface of the casing as may be desired.

The fuse assembly may include a braid assembly positioned between the disclosed deflectable dome and the fuse. The fuse assembly may include a disconnect hammer positioned between the deflectable dome and the fuse. The disconnect hammer may establish electrical communication with the fuse in response to deflection of and electrical communication with the deflectable dome.

The disclosed lithium ion battery generally includes a plurality of lithium ion core members, i.e., electrochemical units, positioned within the container/assembly. One or more endothermic materials may be positioned in proximity to one or more of the lithium ion core members. A support member may be positioned in an internal region defined by the container, and the support member may advantageously define a plurality of cavities, such that the plurality of lithium ion core members may be positioned within a corresponding one of the plurality of cavities.

The support member may include a kinetic energy absorbing material. The kinetic energy absorbing material may be formed of one of aluminum foam, ceramic, ceramic fiber, and plastic.

A plurality of cavity liners may be provided, each positioned between a corresponding one of the lithium ion core members and a surface of a corresponding one of the cavities. The cavity liners may define polymer and metal foil laminated pouches. A cavity liner may be positioned between each of the lithium ion core members and a surface of a corresponding one of the cavities. The cavity liners may be formed of a plastic or aluminum material. The plurality of cavity liners may be formed as part of a monolithic liner member.

An electrolyte is generally contained within each of the lithium ion core members. The electrolyte may include a flame retardant, a gas generating agent, and/or a redox shuttle.

Each lithium ion core member includes an anode, a cathode and separator disposed between each anode and cathode. An electrical connector is positioned within the container and electrically connects the core members to an electrical terminal external to the container. The fuse may be located at or adjacent to the electrical terminal external to the container.

The electrical connector may include two bus bars, the first bus bar interconnecting the anodes of the core members to a positive terminal member of the terminal external to the enclosure, and the second bus bar interconnecting the cathodes of the core members to a negative terminal member of the terminal external to the enclosure. The core members may be connected in parallel or in series. A first set of core members may be connected in parallel and a second set of core members may be connected in parallel. The first set of core members may be connected in series with the second set of core members.

The support member may take the form of a honeycomb structure. The container may include a wall having a compressible element which when compressed due to a force impacting the wall creates an electrical short circuit of the lithium ion battery. The cavities defined in the support member and their corresponding core members may take be cylindrical, oblong, or prismatic in shape. The lithium ion battery according to any of the preceding claims, wherein the container includes a fire retardant member in the internal region.

The disclosed lithium ion battery may include a fire retardant member, e.g., a fire retardant mesh material affixed to the exterior of the container.

The disclosed lithium ion battery may include one or more endothermic materials, e.g., within a ceramic matrix. The endothermic material(s) may be an inorganic gas-generating endothermic material. The endothermic material(s) may be capable of providing thermal insulation properties at and above an upper normal operating temperature associated with the proximate one or more lithium ion core members. The endothermic material(s) may be selected to undergo one or more endothermic reactions between the upper normal operating temperature and a higher threshold temperature above which the lithium ion core member is liable to thermal runaway. The endothermic reaction associated with the endothermic material(s) may result in evolution of gas.

The endothermic material(s) may be included within a ceramic matrix, and the ceramic matrix may exhibit sufficient porosity to permit gas generated by an endothermic reaction associated with the endothermic material(s) to vent, thereby removing heat therefrom. See, e.g., WO 2015/179625 to Onnerud et al., the content of which is incorporated herein by reference.

The disclosed lithium ion battery may include a vent structure that is actuated at least in part based on an endothermic reaction associated with the endothermic material(s). The lithium ion battery may include a pressure disconnect device associated with the casing. The pressure disconnect device may advantageously include a deflectable dome-based activation mechanism. The deflectable dome-based activation mechanism may be configured and dimensioned to prevent burn through. Burn through may be prevented by (i) increasing the mass of the dome-based activation mechanism, (ii) adding material (e.g., foil) to the dome-based activation mechanism, or (iii) combinations thereof.

The increased mass of the dome-based activation mechanism and/or the material added to the dome-based activation mechanism may use the same type of material as is used to fabricate the dome-based activation mechanism. The increased mass of the dome-based activation mechanism and/or the material added to the dome-based activation mechanism may also use a different type of material (at least in part) as compared to the material used to fabricate the dome-based activation mechanism.

The design of the dome-based activation mechanism (e.g., material(s) of construction, geometry, and/or thickness/mass) may be effective in avoiding burn through at least in part based on the speed at which the dome-based activation mechanism will respond at a target trigger pressure.

In further exemplary embodiments of the present disclosure, a lithium ion battery is provided that includes (i) a container that defines a base, side walls and a top face; (ii) a deflectable dome structure associated with the container, and (iii) a fuse assembly including a fuse that is located at or adjacent to an electrical terminal externally positioned relative to the container. The fuse may be adapted, in response to a pressure build-up within the container beyond a threshold pressure level, to electrically isolate lithium ion battery components positioned within the container. The fuse may be positioned within a fuse holder. The disclosed lithium ion battery may also include a vent structure that is adapted to vent in response to a vent pressure of between about 10 psi and 140 psi.

Additional features, functions and benefits of the present disclosure will be apparent from the detailed description which follows, particularly when read in conjunction with the accompanying figures.

BRIEF DESCRIPTION OF FIGURES

To assist those of skill in the art in making and using the disclosed assemblies, systems and methods, reference is made to the appended figures, wherein:

FIG. 7A is an assembled view of the exemplary multi-core subassembly of FIG. 7 according to the present disclosure;

DESCRIPTION OF EXEMPLARY EMBODIMENT(S)

Figure 1:
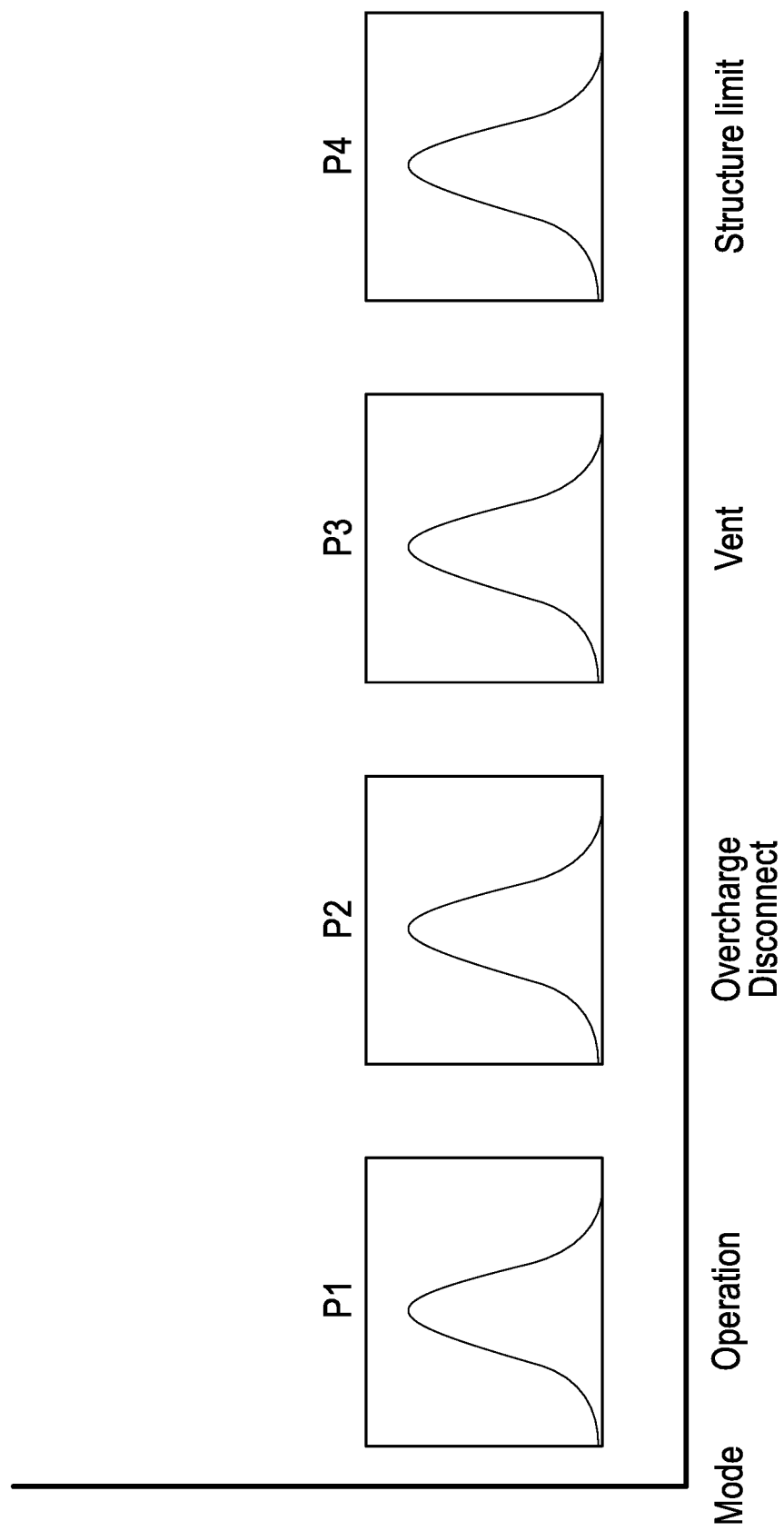
FIG. 1 is a schematic diagram that illustrates the sequence of fail safe mechanisms for a container design according to the present disclosure.

In order to overcome the issues noted above and to realize safe and reliable prismatic cells across a range of sizes, including large prismatic cells, the present disclosure provides advantageous designs that perform venting and pressure disconnect actions in an effective and reliable manner, without risk for flashback and without nuisance failures in regular use. The designs disclosed herein may be used in combination and/or may be implemented in whole or in part to achieve desirable prismatic cell systems. As will be apparent to persons skilled in the art, the disclosed designs have wide ranging applicability and offer significant benefits in a host of applications, including lithium ion battery systems that are designed for use in battery electric vehicles (BEV), Plug-in Hybrid Electric Vehicles (PHEV), Hybrid Electric Vehicles (HEV), electric trains, grid storage (GRID), construction, mining and forestry equipment, forklifts, lead acid replacement (LAR), and other battery supported devices and systems that typically use multiple Li-ion cells.

Although the disclosed designs/systems are described largely in the context of a Li-ion cell using an array of individual jelly rolls, such as described in the PCT application entitled Lithium Ion Battery (PCT/US2013/064654) and the PCT application entitled Lithium Ion Battery with Thermal Runaway Protection (PCT/US2015/031948), it is understood by those skilled in the art that the disclosed designs and solutions may also be deployed in other prismatic and other cylindrical cell systems that package one or a plurality of cells (such as those made by AESC, LG) or that package standard prismatic cells having one or more non-separated flat wound or stacked electrode structures (such as those made by SDI, ATL and Panasonic). The disclosed designs/systems may also be used for encapsulating modules of sealed Li-ion cells. Thus, the disclosed pressure disconnect devices and/or the disclosed vent structures may be incorporated into lithium ion batteries wherein the electrochemical units or jelly rolls are either individually sealed, or not individually sealed.

Firstly, it is noted that the typical container structure for a large prismatic Li-ion cells is a rectangular metal container typically made from aluminum. These containers/casings generally expand due to two main factors:

1. Electrode structures that are cycling will cause the container walls to expand and contract, as lithium is intercalating the anode and cathode structures during charge and discharge. Unless the container is constrained through external pressure, so that this flexing becomes largely elastic, the container will permanently expand. Such expansion results in lowered stack pressure and even separation of electrode structures, leading to poor cycle life and dry out within the electrode structures, unless pressure is applied externally upon the electrodes. Such pressure is typically applied through the module construction, leading to heavy thick gauge material that result in increased weight and volume, with lowered energy density and specific energy, or by creating very thick walls that provide the requisite stack pressure support.

2. The container permanently expands when gas pressure is built up within the cell, during regular use. Such pressures are typically less than 5 psig, which is much less than the pressure walls see from the electrode expansion above.

When the prismatic cell container houses individual jelly rolls that are not individually sealed, i.e., open to a shared atmosphere region, as described in the above-noted PCT applications, the first noted issue above (container wall expansion and contraction) is not a concern as none of the jelly rolls applies pressure on the container wall. However, internal pressure is still a concern.

For the case when the prismatic container houses electrode structures that apply pressure on the wall, the container generally requires mechanical support to limit expansion, as otherwise the cells would dislocate within the pack and the cell will lose electrode stack pressure, resulting in premature failure of the cell. Absent the design innovations described herein, to resolve this fundamental design issue, the wall thickness of the container/casing needs to be increased or external pressure needs to be applied. Obviously, thinner walls are desirable because, inter alia, the thinner the walls can be made, the higher the volumetric capacity as more room for electrodes is available. In general, it is desired to have as low wall thickness as possible without losing structural stability, as thinner walls translate to lowered weight and higher internal volume, leading to increased energy density and specific capacity.

If a vent structure is mounted on or otherwise defined with respect to an expanding wall, the vent risks deformation with cracking and degradation of the vent structure, which lowers venting pressure uncontrollably and negatively impacts the overall reliability of the vent functionality.

If the operational pressure for the pressure disconnect (and/or the vent) is too high, there is an issue in effectively sealing the can or container mechanically or with a laser weld, as the bending action when the container/casing expands has the potential to break the seal, thereby causing a system failure.

Further, it has also been found that if a vent opening is too small, the seal or terminal structures may start leaking as pressure increases inside the container/casing and such increased pressure cannot be released fast enough during certain types of abuse, such as an internal short.

FIG. 1 shows the sequence of the fail safe mechanisms for a container/casing design (the x axis schematically represents pressure within the system). P1 represents the pressure for regular operation of the battery, P2 represents the pressure at which a pressure disconnect device (if used) should be activated, P3 represents a pressure at which a venting mechanism should be activated, and P4 represents the pressure when the can/container seal, terminal feedthrough and/or other parts of container start leaking (i.e., the overall pressure rating of the container/casing). It is essential for safe operation that spacing of these pressures can be achieved in mass production without an ability that the normal distribution for production of operational pressure of one component enters the region of the normal distribution for another component.

For instance, an overcharge disconnect (i.e., pressure disconnect device) cannot cause premature short circuiting of the battery (i.e., P2 is within the P1 range), as that prematurely disables operation of the battery. Similarly, if the vent does not activate before other structures start leaking (i.e., P3 is within the P4 range), the direction of the venting which results from leaking (or other system failure) cannot be controlled, which may result in venting hot gasses or a flame into a neighboring cell, causing cascading failures.

In establishing a vent structure in battery systems of the type disclosed herein, it is desirable to provide a vent mechanism that operates at very low pressures (P3 in FIG. 1) without risking nuisance failures in regular use due to that relatively high metal residuals can be maintained at the score site. This low pressure for P3 in turn allows use of mechanically sealed cans/containers, or alternatively laser welding can be used to seal the can, because the P4 pressure may also be reduced without risking an overlap with P3. Thus, the ability to reliably reduce P3 may translate to an overall improvement in battery system design and operation.

Moreover, the area of the vent should be relatively large to allow a reliable opening pressure with a controllable flow area, allowing for quicker pressure release and eliminating atomization of the electrolyte. A larger vent area should generally produce a design with increased safety.

In exemplary embodiments of the present disclosure that include a venting mechanism alone (i.e., without a pressure disconnect device), the vent pressure (P3) is on the order of about 10 psig to about 140 psig, and the structural limit pressure of the container (P4) is at least about 10% higher than the vent pressure.

In exemplary embodiments that include both a pressure disconnect device and a venting mechanism, the pressure at which the pressure disconnect device is activated is generally dependent on the overall design of the lithium ion battery. However, the threshold pressure within the casing which activates the disclosed pressure disconnect device is generally 10 psig or greater, and is generally in the range of 10-40 psig. In embodiments that also include a venting mechanism, the pressure at which the vent mechanism is activated to vent, i.e., release pressurized gas from the casing, is generally at least 5 psig greater than the pressure at which the pressure disconnect device is activated. Thus, for example, if the pressure disconnect device is set to activate at 15 psig, then in exemplary embodiments of the present disclosure, the independent vent structure may be selected so as to vent at 20 psig. Of note, the overall pressure rating of the casing itself, i.e., the pressure at which the casing may fail, is generally set at a pressure of at least 5 psig greater than the pressure at which the vent structure is activated. Thus, in the example described above (activation of pressure disconnect device at 15 psig; activation of vent structure at 20 psig), the casing is generally designed to withstand an internal pressure of at least 25 psig. The pressure rating of the casing has particular importance with respect to interface welds and other joints/openings that include sealing mechanisms where failures are more likely to occur.

Several vent type geometric shapes exist today and are generally designed to fail at score line(s) defining the vent at specified pressures. The main concern with straight line vents, "Y" vents, and radial vents is that they generally do not open completely since the crack propagation may not always choose the same path. A round vent is generally preferred because it can quickly open a large area and the residual metal flap can quickly bend out of the way so that gas can be released without significant pressure increase of the container. Optimal vent designs are effective in that, upon a venting event, all gas can quickly be released without build-up of increased pressure inside the can/container due to further gas generation.

For example, for circular or substantially circular vent openings, an opening diameter of about 1½ inches may provide suitable vent functionality for batteries of the present disclosure, although alternative diameter openings may be employed based on features/functions of a specific battery implementation. For non-circular vent openings, an overall vent area of between about 0.4 cm$^2$ to about 12 cm$^2$ may be effectively employed, although again alternative vent areas may be provided based on the features/functions of specific battery implementations.

Although an increased vent area limits atomization of the electrolyte in connection with a venting event, there is a risk for flashback. Such flashback can ignite the electrolyte of isolated electrode structures inside the cell that have not failed during the abuse conditions, such as an internal short. In order to limit this risk, a flame arrestor may be advantageously positioned in proximity to the vent in order to prevent a flame front from reentering the enclosure containing the multi-roll structure. In exemplary embodiments of the present disclosure, a flame arrestor is positioned internal to the vent structure, i.e., across the area defined by and/or in the vicinity of the score line that forms/defines the vent structure and/or initiates the vent functionality.

In the event of a failure of an individual jellyroll, a large amount of gas is generated (~10 liters), and this gas is both hot (~250-300° C.) and flammable. It is likely that this gas will ignite outside of the multi-jellyroll enclosure after a vent occurs. To prevent and/or reduce the likelihood that the flame will enter the cell, a mesh may be advantageously placed/positioned over the vent area to function as a flame arrestor. This mesh functions to reduce the temperature of the exiting gas stream below its auto-ignition temperature.

Since the mesh is serving as a heat exchanger, greater surface area and smaller openings reject more heat, but decreasing the open area of the mesh increases the forces on the mesh during a vent. A 30 US standard mesh, 0.012" wire diameter, has been found to be effective in preventing flashback for the large Li-ion batteries tested. Other mesh sizes are expected to function effectively, but the 30 mesh is preferred due to its general supply availability and effective arrestor function for Li-ion batteries. A 30 mesh has an open area of 40%, which means that in a vent at 70 psi, the mesh must withstand instantaneous forces of 70 psi*0.6=42 lbf/in$^2$ of vent area. For reasonable vent areas, such as those used for the Li-ion application, calculated stresses in the mesh from this loading are modest. For instance, for a 2 inch diameter vent, (larger than can be fit on the sidewall of a conventional battery container), the instantaneous stress in the mesh at vent is roughly:

$$((pi*1 \text{ in}^2)*42 \text{ lbf/in}^2)/(pi*2 \text{ in}*0.012*0.6*0.7854) = \sim 3714 \text{ psi}$$

The yield strength of copper is ~20,000 psi.

Exemplary Pressure Disconnect Device (PDD) Implementations

Figure 2A:
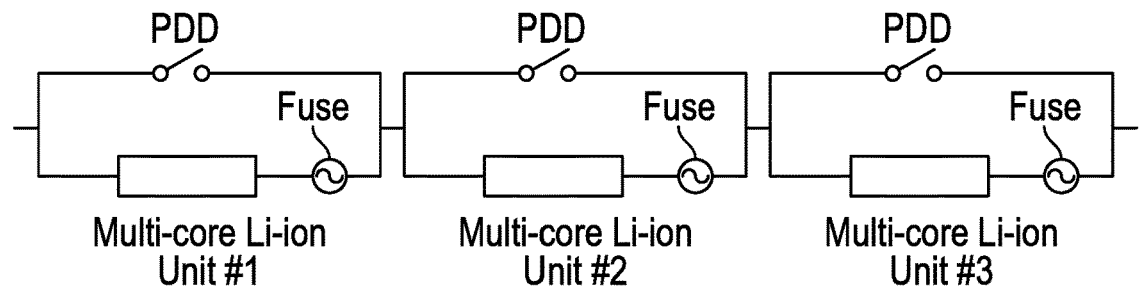
FIG. 2A is a schematic view of exemplary module circuitry associated with a multi-core lithium ion battery in normal operation according to the present disclosure.
Figure 2B:
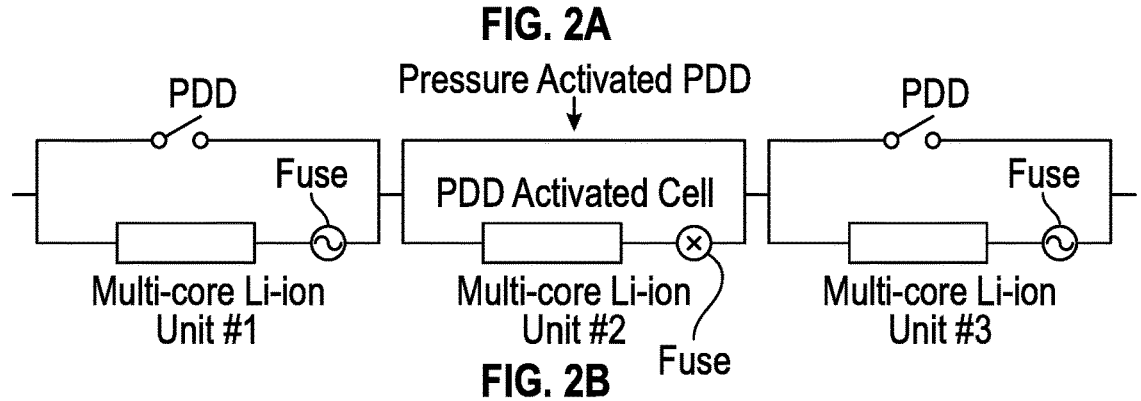
FIG. 2B is a schematic view of the exemplary module circuitry associated with a multi-core lithium ion battery of FIG. 2A after activation of a pressure disconnect device ("PDD") according to the present disclosure.

In exemplary implementations of the present disclosure, a current interruption assembly, i.e., a pressure disconnect device, is provided that may be activated by internal pressure conditions of a lithium ion battery and, particularly, a multi-core lithium ion battery. With reference to FIGS. 2A-2B, an exemplary battery module that includes a plurality of multi-core lithium ion electrochemical units (e.g., jelly rolls) is schematically depicted. More particularly, the schematic illustrations of FIGS. 2A-2B include three (3) distinct multi-core lithium ion electrochemical units. Although three multi-core lithium ion units are schematically depicted in FIGS. 2A-2B, the present disclosure is not limited by or to implementations that include three multi-core lithium ion units.

Each of the multi-core lithium ion electrochemical units is associated with a pressure disconnect device (PDD) and, as shown schematically in FIG. 2B, the $2^{nd}$ unit has experienced an overcharge condition that has triggered activation of the PDD (as schematically depicted by the "X" in the circuit). Activation of the PDD for the $2^{nd}$ unit has resulted in an external short of the cell and, based on the blown fuse, the electrochemical unit is isolated from the overall circuit. As discussed below, the fuse is advantageously positioned external to the battery casing and is associated with the negative terminal. In response to activation of the PDD, current is by-passed through the casing of the battery.

Figure 3:
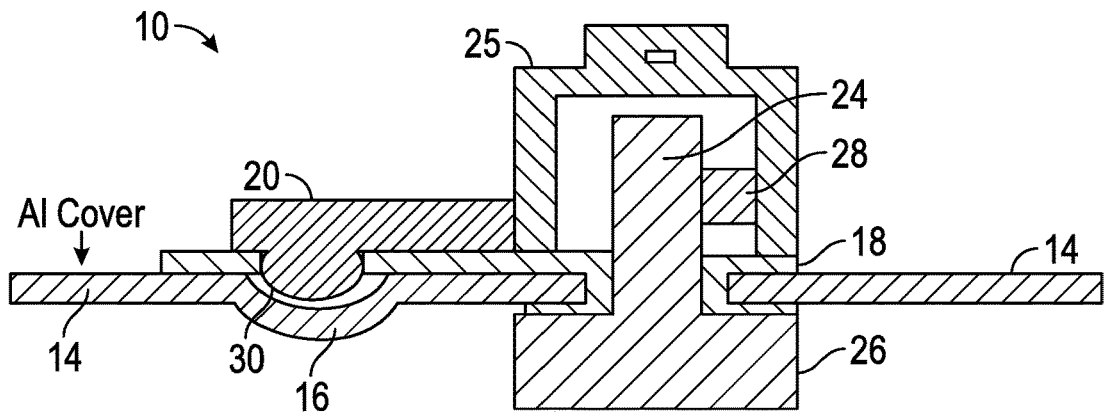
FIG. 3 is a schematic view of an exemplary PDD design (in a normal operation state), wherein a fuse is positioned external to a battery casing/cover and in association with the negative terminal thereof.
Figure 4:
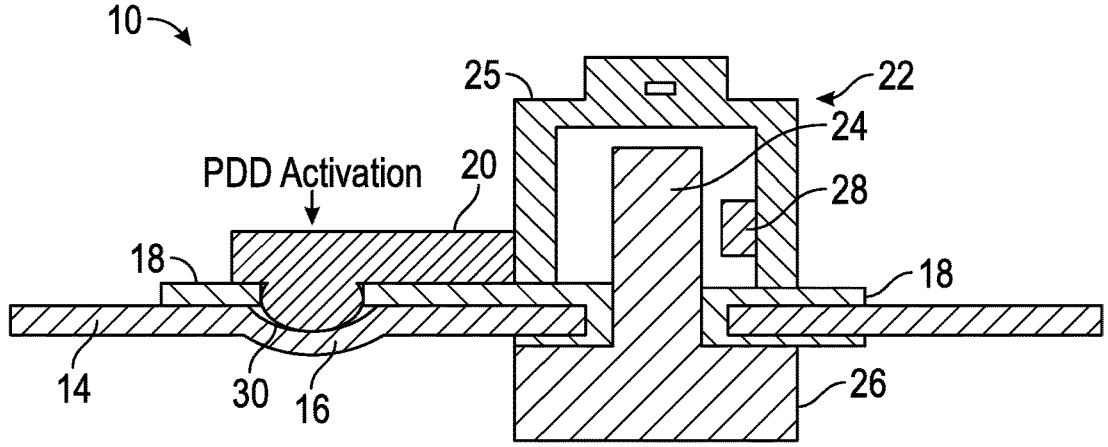
FIG. 4 is a schematic view of the exemplary PDD design of FIG. 3, wherein the PDD has been activated in response to an over-pressure condition within the battery casing and the fuse associated with the negative terminal has blown.

Turning to FIGS. 3 and 4, schematic views of exemplary PDD assembly 10 that is pressure activated according to the present disclosure are provided. The PDD assembly 10 includes a deflectable/deformable dome 16 associated with a cover 14 of the lithium ion battery casing (not shown). Cover 14 is advantageously fabricated of aluminum, although alternative materials may be employed without departing from the spirit/scope of the present disclosure (e.g., stainless steel). A deflectable/deformable dome 16 is associated with cover 14. Deflectable/deformable dome 16 may be fabricated from various materials, including aluminum of reduced cross-section relative to the remainder of cover 14. Thus, deflectable/deformable dome 16 may be integrally formed with cover 14 or attached or adhered with respect to an opening defined in cover 14, e.g., welded with respect thereto.

An insulation layer 18 is positioned between the cover 14 and a PDD activation arm 20. The insulation layer 18 generally extends into the electrode region 22, e.g., to electrically isolate the upstanding copper terminal 24 and bus bar 26 from the cover 14. A fuse element 28 is associated with the electrode region 22 so as to complete the circuit between upstanding terminal 24 and terminal element 25.

As shown in FIG. 3, dome 16 and PDD activation arm 20 are initially spaced relative to each other, thereby preventing electrical communication therebetween. A gap in insulation layer 18 is provided adjacent dome 16, thereby permitting physical contact and electrical communication between dome 16 and PDD activation arm 20 when a threshold internal pressure is reached within the battery casing. In exemplary embodiments, PDD activation arm 20 may define a geometry that cooperates with the geometry of dome 16, e.g., a mushroom-like knob 30 extending from an end region of activation arm 20, to ensure effective contact therebetween. Alternative cooperative geometries may be employed, as will be readily apparent to persons skilled in the art.

As shown in FIG. 4, if the internal pressure within the battery casing exceeds a certain level, the dome 16 will deflect upward into contact with knob 30 of PDD activation arm 20, thereby completing an electronic circuit between the bus bar 26, upstanding terminal 24, fuse 28, terminal element 25, activation arm 20 and cover 14. Completion of this circuit exceeds the capacity of fuse 28, which "blows" (as shown in FIG. 4), thereby by-passing all current associated with the battery through the casing (including the cover) thereof.

Appropriate fuse diameters may be calculated using the Onderdonk equation.

$$I_{fuse}=Area*SQRT(LOG((T_{melt}-T_{ambient})/(234-T_{ambient})+1)/Time*33)$$

Where:
- $T_{melt}$ is the melting temp of wire in degrees Centigrade
- $T_{ambient}$ is the ambient temp in degrees Centigrade
- Time is the melting time in seconds
- $I_{fuse}$ is the fusing current in amps
- Area is the wire area in circular mils (where "circular mils" is the diameter of the wire in thousandths of an inch (mils) squared. That is, it is the area of a circle 0.001" in diameter.)

Assuming a 700 amp current for the fusing current, application of the Onderdonk equation yields the following wire diameter results:

| Melting time (s) | 1 | 5 | 10 |
| --- | --- | --- | --- |
| Aluminum wire area (mm²) | 2.62 | 5.86 | 8.28 |
| Aluminum wire diameter (mm) | 1.83 | 2.73 | 3.25 |

Thus, the Onderdonk equation shows that, assuming a 700 amp fusing current, an aluminum fuse diameter of 2.73 mm would be effective in the exemplary assembly of FIGS. 3 and 4 for a melting time of five (5) seconds. Alternative fuse materials/diameters may be employed, as will be readily apparent to persons skilled in the art.

Turning to FIGS. 5-11, schematic illustrations of lithium ion battery implementations according to the present disclosure are provided. With initial reference to FIG. 5, an exploded view of an exemplary multi-core lithium ion battery 100 is provided. An assembled view of the exemplary lithium ion battery is provided in FIG. 5A.

Battery 100 includes an outer can or casing 102, that defines an interior region for receipt of components, as follows:

- An aluminum bus bar 104 that defines a plurality (24) of openings (e.g., circular openings);
- A housing or support structure 106 that defines a plurality (24) of spaced, substantially cylindrical regions or cavities that are configured and dimensioned to receive jelly roll/jelly roll sleeve subassemblies;
- A plurality (24) of jelly roll sleeves 108 configured and dimensioned to receive corresponding jelly rolls and to be positioned within the cylindrical regions defined by housing 106—the jelly roll sleeves 108 may be fabricated of various materials, e.g., polymers or metals, and may take the form of polymer and metal foil laminated foil pouches;
- A plurality (24) jelly rolls 110, i.e., electrochemical units, configured and dimensioned to be positioned within jelly roll housings 108;
- A plurality (24) of substantially circular jelly roll backing sheets 111 positioned between bus bar 104 and the jelly rolls 110;
- A plurality (24) jelly roll covers 112 that are configured and dimensioned to cover the jelly rolls 110 positioned within the cavities defined by housing 106;
- A copper bus bar 114 that defines a substantially H-shaped geometry so as to effect electrical communication with each of the jelly rolls 110;
- A bus bar insulator 116 that defines a geometry that generally corresponds to the geometry of bus bar 114 so as to insulate the bus bar 114 relative to the top cover of the battery assembly;
- A plurality (6) of anti-vibration mats that are positioned between the bus bar insulator 116 and the top cover to absorb potential vibration and minimize relative movement therebetween;
- A substantially rectangular top cover 120 that is configured and dimensioned to cooperate with the outer can 102 to encase the foregoing components therewithin;
- A plurality (24) of steel balls 122 positioned on the exterior of the top cover 120 to obstruct openings formed in the top cover 120 to facilitate electrolyte introduction to the jelly rolls;
- One or more anti-vibration mats 124 are positioned between the outer can 102 and the outer wall(s) of housing 106 to further dampen vibration and prevent movement therebetween.

Of note, the corners of the outer can/casing 102, bus bar 104, housing 106 and top cover 120 are generally radiused at their respective corners to minimize size and facilitate manufacture/assembly. Of further note, the jelly rolls 110 positioned within housing 106 define a multi-core assembly that generally share headspace within outer can 102 and top cover 120, but do not communicate with each other side-to-side. Thus, any build-up in pressure and/or temperature associated with operation of any one or more of the jelly rolls 110 will be spread throughout the shared headspace and will be addressed, as necessary, by the safety features described herein below. However, electrolyte associated with a first jelly roll 110 does not communicate with an adjacent jelly roll 110 because the substantially cylindrical regions defined by housing 106 isolate jelly rolls 110 from each other from a side-to-side standpoint. The sleeves 108 further contribute to the side-to-side electrolyte isolation as between adjacent jelly rolls 110.

With further reference to FIGS. 5, 5A, 6, 6A, 7, 7A, 8 and 8A (collectively, FIGS. 5-8), exemplary safety features associated with lithium ion battery 100 include a vent assembly 200 and a pressure disconnect device (PDD) assembly 300. According to the exemplary battery 100 of FIGS. 5-8, operative components of vent assembly 200 and PDD assembly 300 are mounted/positioned along a top wall 126 of outer can 102. However, alternative positioning (in whole or in part) of one or both of vent assembly 200 and/or PDD assembly 300 may be effectuated without departing from the spirit/scope of the present disclosure, as will be apparent to persons skilled in the art based on the present disclosure.

With initial reference to vent assembly 200, it is noted that the top wall 126 of outer can or casing 102 defines an opening 128. A flame arrestor 202 and a vent disc 204 are mounted across the opening 128. A seal is maintained in the region of flame arrestor 202 and vent disc 204 by vent adapter ring 206. Various mounting mechanisms may be employed to fix vent adapter ring 206 to top wall 126, e.g., welding, adhesive, mechanical mounting structures, and the like (including combinations thereof). Of note, vent disc 204 is necessarily sealingly engaged relative to top wall 126 and may be formed in situ, e.g., by score line(s) and/or reduced thickness relative to top wall 126, as is known in the art.

As noted above, in the event of a failure of an individual jelly roll (or multiple jelly rolls), a large amount of gas may be generated (~10 liters), and this gas is both hot (~250-300° C.) and flammable. It is likely that this gas will ignite outside of the multi-jelly roll enclosure after a vent occurs. To prevent the flame front from entering the casing, a mesh may be provided to function as flame arrestor 202 and may be advantageously placed or positioned over the vent area, i.e., opening 128. This mesh functions to reduce the temperature of the exiting gas stream below its auto-ignition temperature. Since the mesh is serving as a heat exchanger, greater surface area and smaller openings reject more heat, but decreasing the open area of the mesh increases the forces on the mesh during a vent.

Figure 5:
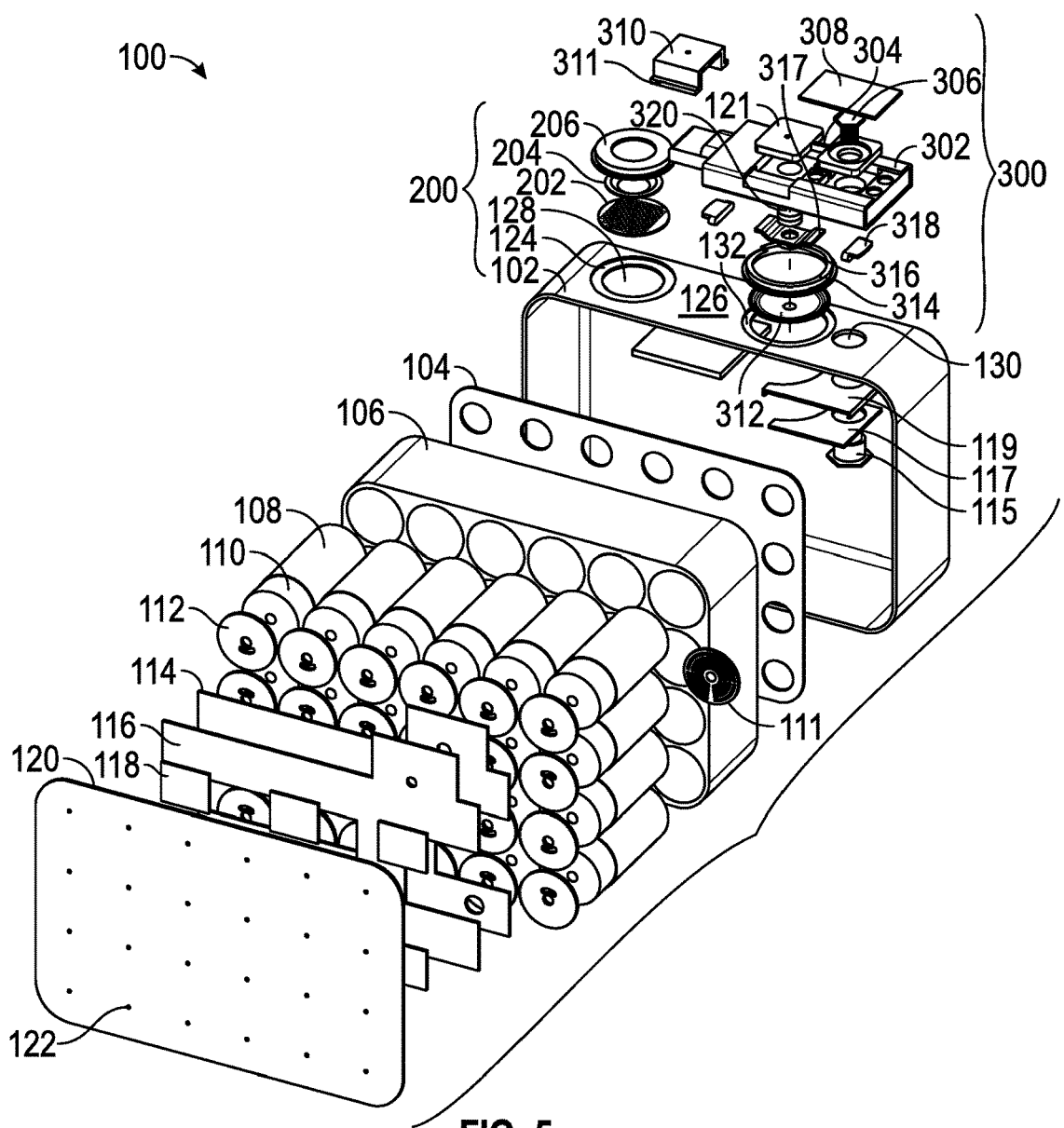
FIG. 5 is an exploded view of an exemplary multi-core lithium ion battery according to the present disclosure.
Figure 5A:
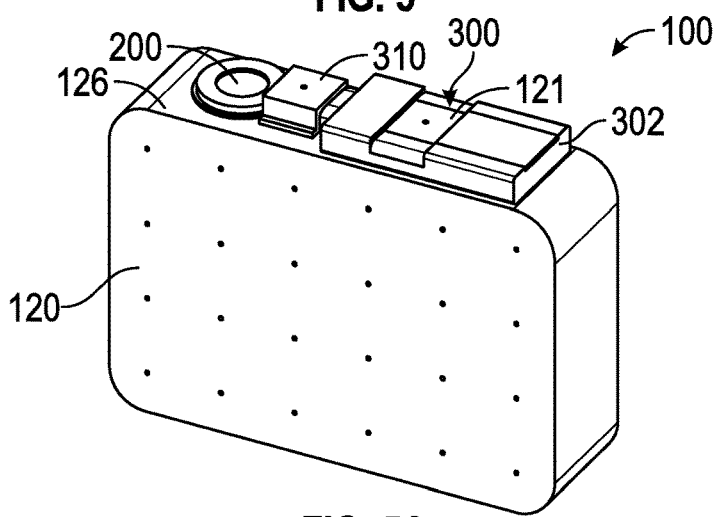
FIG. 5A is an assembled view of the exemplary multi-core lithium ion battery of FIG. 5 according to the present disclosure.
Figure 6A:
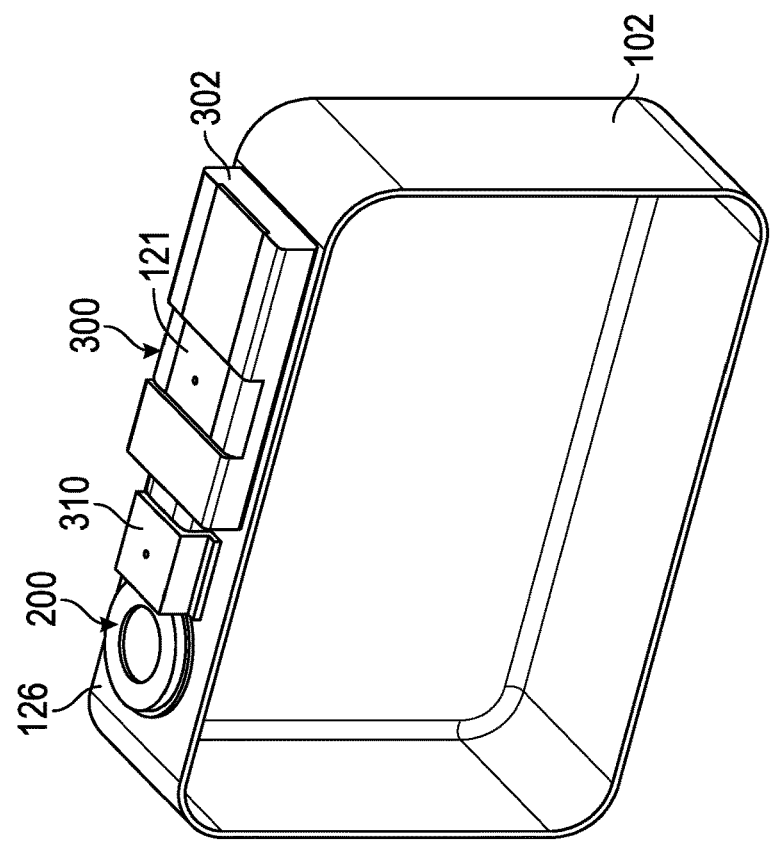
FIG. 6A is an assembled view of the exemplary casing assembly of FIG. 6 according to the present disclosure.
Figure 6:
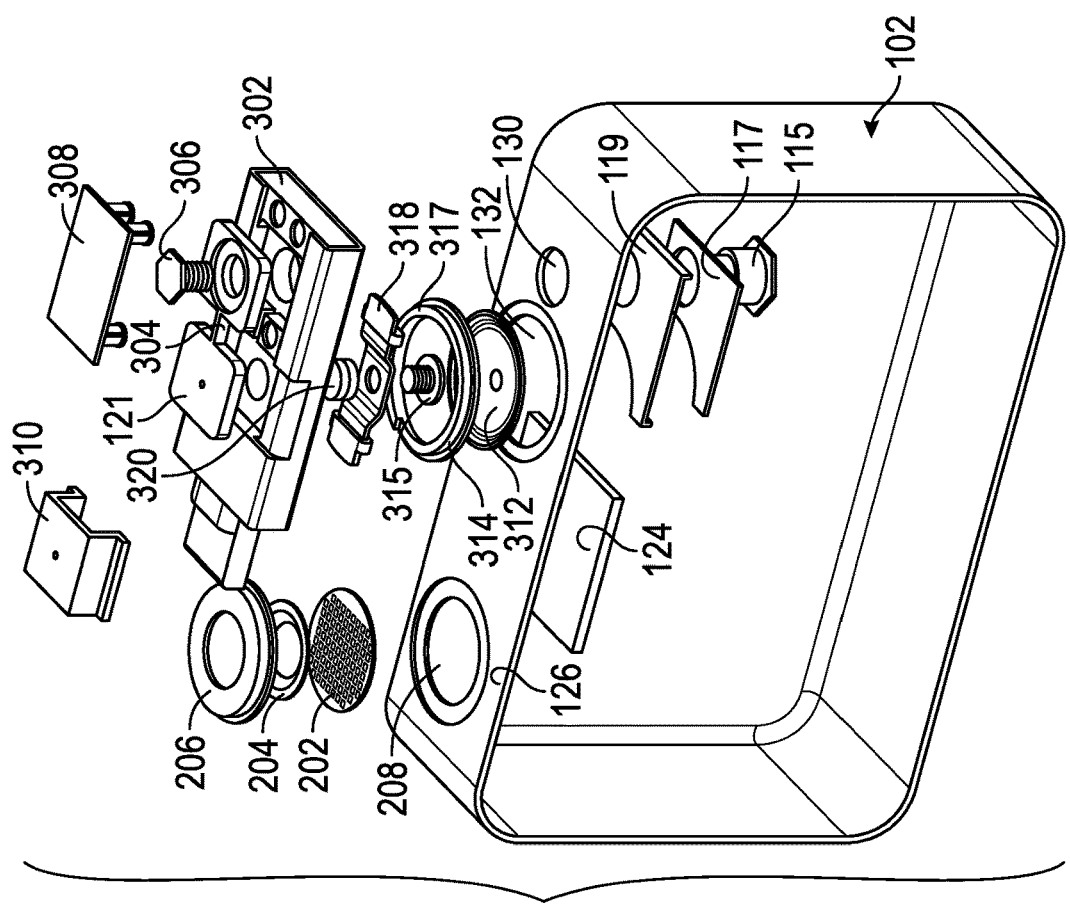
FIG. 6 is an exploded view of an exemplary casing assembly with associated safety features according to the present disclosure.
Figure 7:
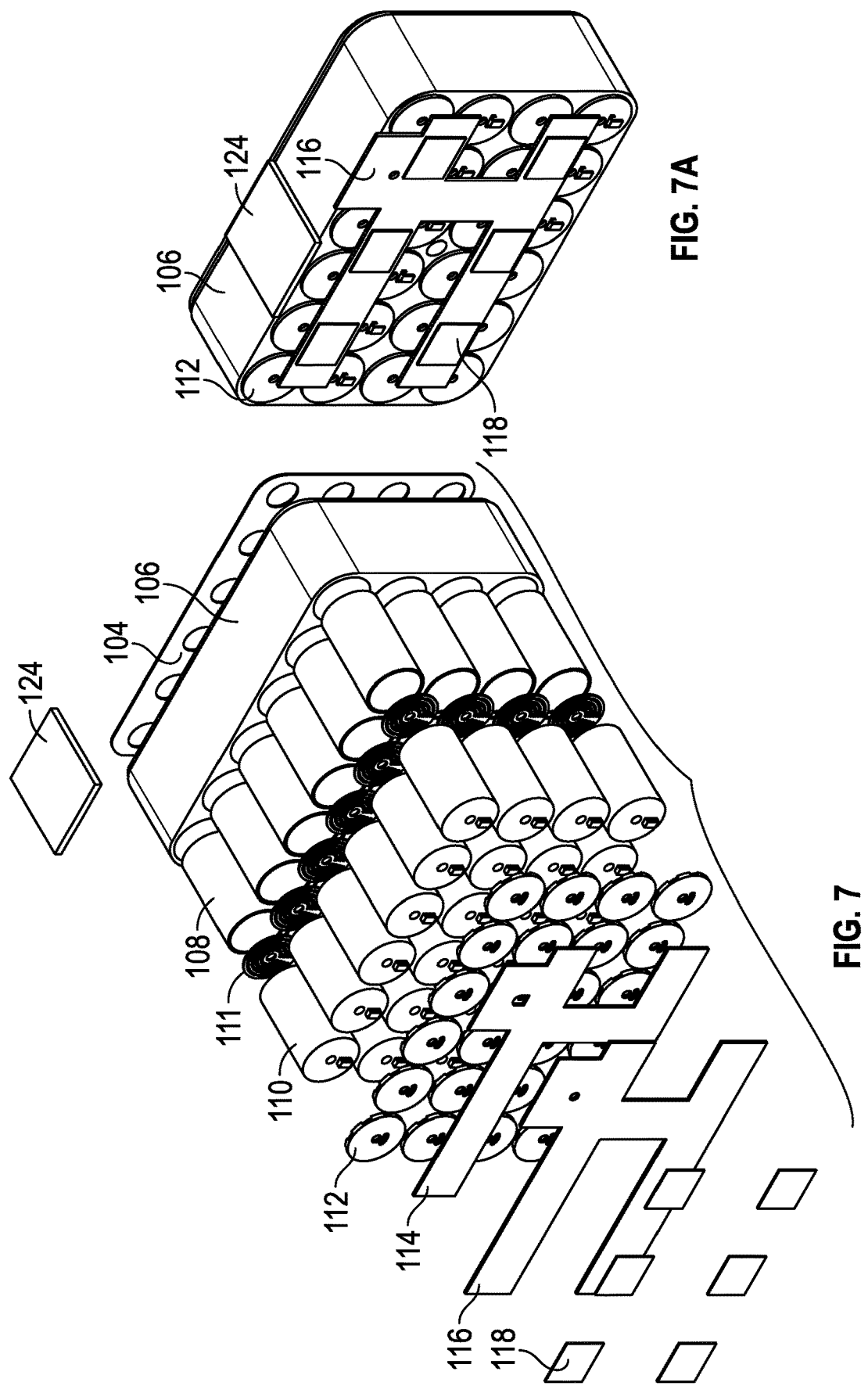
FIG. 7 is an exploded view of an exemplary multi-core subassembly according to the present disclosure.
Figure 8:
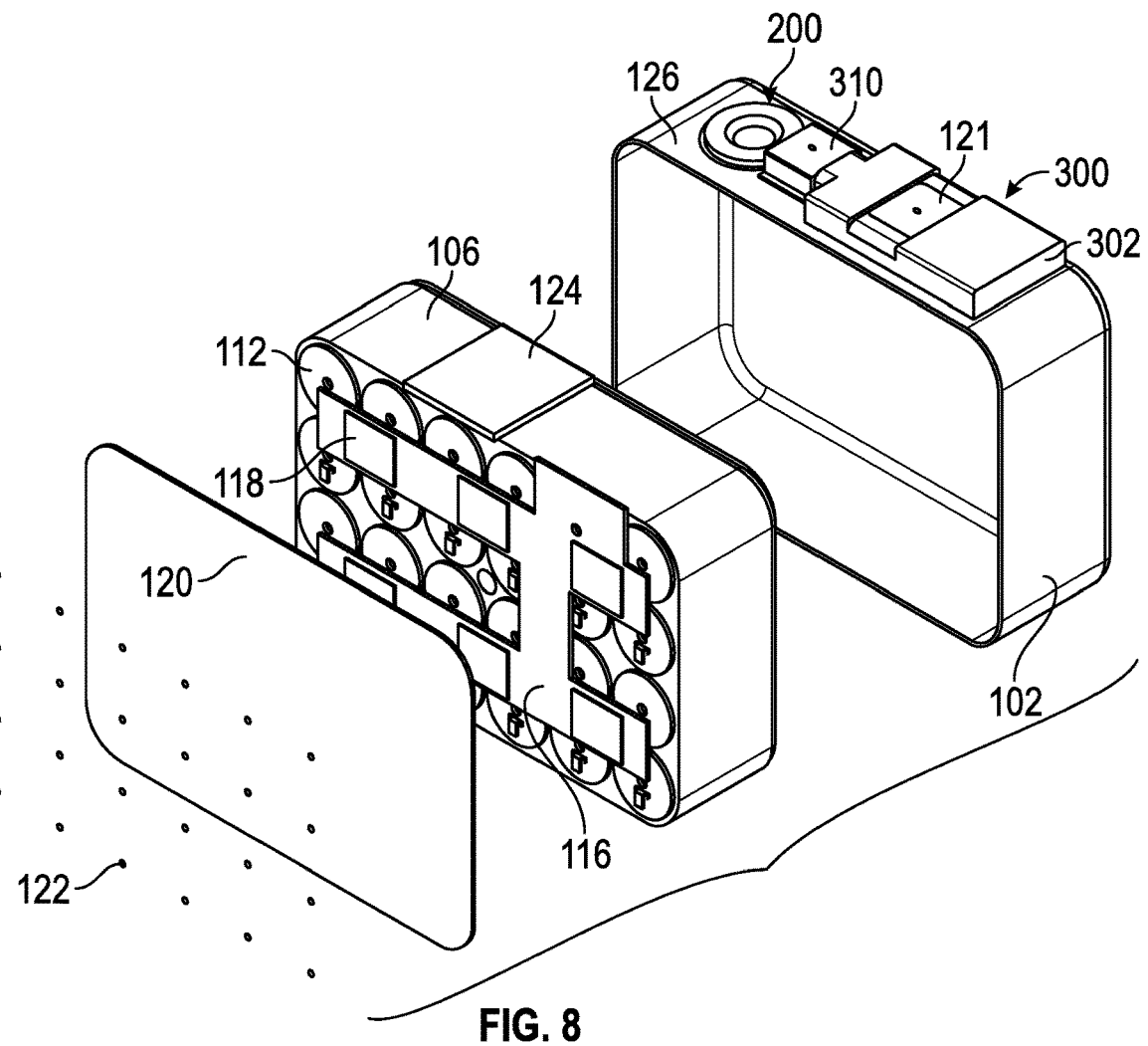
FIG. 8 is an exploded view of an exemplary multi-core lithium ion battery according to the present disclosure.
Figure 8A:
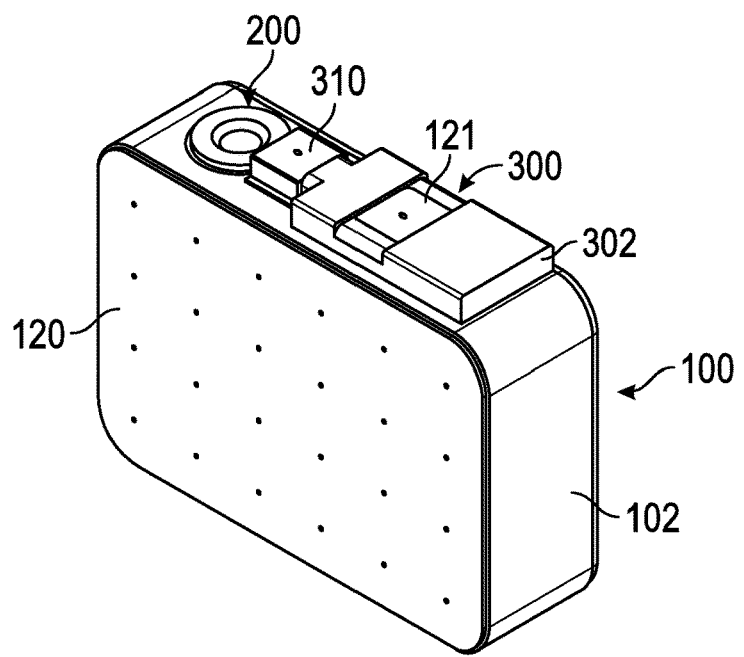
FIG. 8A is an assembled view of the exemplary multi-core lithium ion battery of FIG. 8 according to the present disclosure.

Turning to the electrical aspects of battery 100, the exploded views of FIGS. 5 and 6 show upstanding copper terminal 115 which functions as the anode for the disclosed lithium ion battery and is configured and dimensioned to extend upward thru a further opening 130 formed in the top wall 126 of outer can or casing 102. The upstanding terminal 115 is in electric communication with the copper bus bar 114 and bus bar connector 117 internal to casing 102, and extends thru bus bar connector insulator 119 so as to be exposed upward and outward of outer can/casing 102. The upper end of upstanding copper terminal 115 is positioned within fuse holder 302, which may define a substantially rectangular, non-conductive (e.g., polymeric) structure that is mounted along the top wall 126 of outer can/casing 102. Upstanding terminal 115 is in electrical communication with terminal contact face 121 by way of fuse 304.

Fuse 304 is positioned within fuse holder 302 and external to outer can/casing 102 in electric communication with upstanding copper terminal 115 and terminal contact face 121. A terminal screw 306 may be provided to secure fuse 304 relative to fuse holder 302 and upstanding terminal 115, and the fuse components may be electrically isolated within the fuse holder 302 by fuse cover 308.

A substantially U-shaped terminal 310 defines spaced flange surfaces 311 that are in electrical and mounting contact with the top wall 126 of outer can/casing 102. Aluminum bus bar 104 which is internal to casing 102 is in electrical communication with the outer can/casing 102, thereby establishing electrical communication with terminal 310. Terminal 310 may take various geometric forms, as will be readily apparent to persons skilled in the art. Terminal 310 is typically fabricated from aluminum and functions as the cathode for the disclosed lithium ion battery.

Thus, the anode terminal contact face 121 and cathode terminal 310 are positioned in a side-by-side relationship on the top wall 126 of casing 102 and are available for electrical connection, thereby allowing energy supply from battery 100 to desired application(s).

With reference to exemplary PDD assembly 300, a conductive dome 312 is positioned with respect to a further opening 132 defined in the top wall 126 of outer can/casing 102. Dome 312 is initially flexed inward relative to the outer can/casing 102, and is thereby positioned to respond to an increase in pressure within the outer can by outward/upward deflection thereof. Dome 312 may be mounted with respect to top wall 126 by a dome adapter ring 314 which is typically welded with respect to top wall 126. In exemplary implementations and for ease of manufacture, dome adapter ring 314 may be pre-welded to the periphery of dome 312, thereby facilitating the welding operation associated with mounting dome 312 relative to top wall 126 due to the increased surface area provided by dome adapter ring 314.

In the exemplary embodiment depicted in FIGS. 5-8, a non-conductive (i.e., insulative) hammer holder 315 is positioned in engagement with a top face of the dome 312, thereby electrically isolating dome 312 from the underside of terminal contact face 121, as described below.

However, it is contemplated that the non-conductive hammer holder 315 and braid assembly may be eliminated in alternative implementations of the present disclosure, as described herein. In an exemplary non-braid implementation, upward/outward deflection of dome 312 (based on an increased pressure within outer can/casing 102) may bring dome 312 into direct contact with the underside of terminal contact face 121. In selecting this approach, care should be taken that the current running thru the dome 312 does not negatively impact the structural integrity of the dome 312. In this respect, the hammer holder/braid assembly implementation described with reference to the embodiment of FIGS. 5-8 offers an exemplary approach to avoiding and/or minimizing potential structural damage and/or failure of the dome by electrically isolating the dome from direct contact with the terminal contact face 121.

With further reference to FIGS. 5 and 6, hammer holder 315 includes an upward extension that is configured and dimensioned to pass through an opening defined in conductive braid 317 and snap connect to disconnect hammer 320 positioned on the other side of braid 317. In this way, hammer holder 315 and disconnect hammer 320 are secured with respect to braid 317 and move in concert therewith. The braid 317 is mounted with respect to a braid base 316 by braid clamps 318 and the subassembly is fixed relative to the top wall 126 of outer can/casing 102, e.g., by welding. Of note, conductive braid 317 is extensible so as to accommodate upward movement of dome 312, hammer holder 315 and disconnect hammer 320 relative to outer can/casing 102.

In use and in response to a build-up in pressure within the assembly defined by outer can/casing 102 and top cover 120, dome 312 will deflect upward relative to top wall 126 of outer can/casing 102. Upon sufficient upward deflection, i.e., based on the internal pressure associated with battery 100 reaching a threshold level, disconnect hammer 320 is brought into contact with the underside of terminal contact face 121 which is in electrical communication with fuse 304 within fuse holder 302. Upward movement of disconnect hammer 320 is permitted due to a "stretching" of braid 317. Contact between disconnect hammer 320 (which is conductive) completes a circuit that runs from cover 126 thru braid 317, hammer head 320, terminal contact face 121, fuse 302, and upstanding terminal 115. The completion of this circuit will cause fuse 302 to "blow", thereby breaking the circuit from the multi-core components positioned within the assembly defined by outer can 102 and top cover 120. Current is bypassed through the outer can 102. Of note, all operative components of PDD assembly 300—with the exception of the deflectable dome 312—are advantageously positioned external to the outer can 102 and top cover 120.

Figure 9:
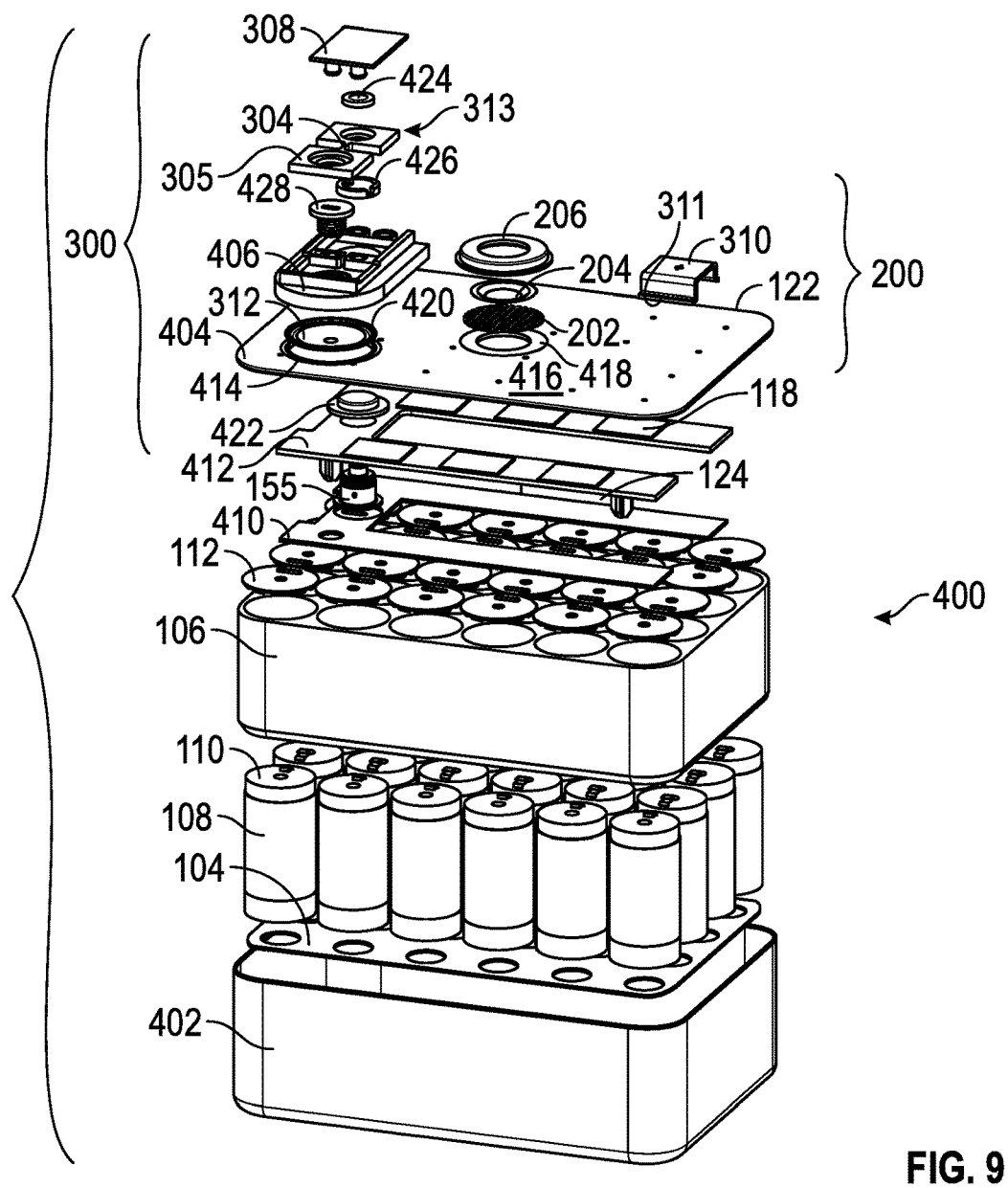
FIG. 9 is an exploded view of an exemplary multi-core lithium ion battery according to the present disclosure.

Turning to FIG. 9, an exploded view of an alternative exemplary multi-core lithium ion battery 400 is provided. An assembled view of the exemplary lithium ion battery is provided in FIG. 9A. FIG. 9 provides an alternate position for vent assembly 200 and PDD assembly 300 as was initially described with reference to the embodiment of FIGS. 5-8. More specifically, in the embodiment of FIG. 9, the vent assembly 200 and PDD assembly 300 are positioned on top cover 404 of battery 400. Battery 400 includes an outer can 402 that defines an interior region for receipt of components, as follows:

An aluminum bus bar 104 that defines a plurality (24) of openings (e.g., circular openings);

A housing or support structure 106 that defines a plurality (24) of spaced, substantially cylindrical regions that are configured and dimensioned to receive jelly roll/jelly roll sleeve subassemblies and to isolate the jelly rolls relative to each other from a side-by-side standpoint;

A plurality (24) of jelly roll sleeves 108 configured and dimensioned to receive corresponding jelly rolls (i.e., electrochemical units) and to be positioned within the cylindrical regions defined by housing 106—the jelly roll sleeves 108 may be fabricated of various materials, e.g., polymers or metals, and may take the form of polymer and metal foil laminated foil pouches, and serve to further isolate electrolyte associated with individual jelly rolls/electrochemical units from communication with adjacent cavities by way of potential lateral flow;

A plurality (24) jelly rolls/electrochemical units 110 configured and dimensioned to be positioned within jelly roll housings 108;

A plurality (24) of substantially circular jelly roll backing sheets (not shown) positioned between bus bar 104 and the jelly rolls 110;

A plurality (24) jelly roll covers 112 that are configured and dimensioned to cover the jelly rolls 110 positioned within housing 106;

A copper bus bar 410 that defines a substantially U-shaped geometry so as to effect electrical communication with each of the jelly rolls 110;

A bus bar insulator 412 that defines a geometry that generally corresponds to the geometry of bus bar 410 so as to insulate the bus bar 410 relative to the top cover of the battery assembly;

A plurality (6) of anti-vibration mats 118 that are positioned between the bus bar insulator 412 and the top cover to absorb potential vibration and minimize relative movement therebetween;

A substantially rectangular top cover or lid 404 that is configured and dimensioned to cooperate with the outer can 402 to encase the foregoing components therewithin and support/accommodate the vent assembly 200 and the PDD assembly 300;

A plurality (24) of steel balls 122 positioned on the exterior of the top cover 404 to obstruct openings formed in the top cover 404 to facilitate electrolyte introduction to the jelly rolls; and One or more anti-vibration mats 124 positioned between the outer can 402 and the outer wall(s) of housing 106 to further dampen vibration and prevent movement therebetween.

Of note, the corners of the outer can 402, bus bar 104, housing 106 and top cover 404 are generally radiused at their respective corners to minimize size and facilitate manufacture/assembly. Of further note, the jelly rolls 110 positioned within housing 106 define a multi-core assembly that generally share headspace/atmosphere region within outer can 402 and top cover 404, but are isolated from one another from a side-by-side standpoint. Thus, any build-up in pressure and/or temperature associated with operation of any one or more of the jelly rolls 110 will be spread throughout the shared headspace/atmosphere region and will be addressed, as necessary, by the safety features described herein below.

With further reference to FIG. 9, the safety features associated with the disclosed lithium ion battery 400 include a vent assembly 200 and a pressure disconnect device (PDD) assembly 300. According to the exemplary battery 400 of FIG. 9, operative components of the vent assembly 200 and the PDD assembly 300 are mounted/positioned on or relative to surface 416 of top cover 404.

With reference to the vent assembly 200, it is noted that surface 416 of top cover 404 defines an opening 418. A flame arrestor 202 and a vent disc 204 are mounted with respect to opening 418, i.e., across such opening. The flame arrestor 202 and vent disc 204 are mounted with respect to surface 416 of top cover 404 by vent adapter ring 206. Various mounting mechanisms may be employed to fix vent adapter ring 206 to the surface 416, e.g., welding, adhesive, mechanical mounting structures, and the like (including combinations thereof). Of note, vent disc 204 is necessarily sealingly engaged relative to surface 416 and may be formed in situ, e.g., by score line(s) and/or reduced thickness relative to surface 416, as is known in the art.

As noted above, in the event of a failure of an individual jellyroll, a large amount of gas may be generated (~10 liters), and this gas is both hot (~250-300° C.) and flammable. It is likely that this gas will ignite outside of the multi-jellyroll enclosure after a vent occurs. To prevent the flame front from entering the internal volume defined by outer can 402 and top cover 404, a mesh may be provided to function as flame arrestor 202 and may be advantageously placed/positioned over the vent area, i.e., opening 418. This mesh advantageously functions to reduce the temperature of the exiting gas stream below its auto-ignition temperature. Since the mesh is serving as a heat exchanger, greater surface area/smaller openings reject more heat, but decreasing the open area of the mesh increases the forces on the mesh during a vent.

Turning to the PDD assembly 300, the exploded view of FIG. 9 shows upstanding copper terminal 115 functions as the anode for lithium ion battery 400 and is configured and dimensioned to extend upward thru a further opening 420 formed in the surface 416 of the top cover 404. The upstanding terminal 115 is in electric communication with the copper bus bar 410 positioned within the internal volume defined by outer can 402 and top cover 404, and extends thru bus bar insulator 412 and seal ring 422 so as to be exposed upward of top cover 404. The upper end of upstanding copper terminal 115 is positioned within fuse holder 406, which may define a semicircular and square, non-conductive (e.g., polymeric) structure that is mounted on surface 416 of top cover 404.

Figure 9A:
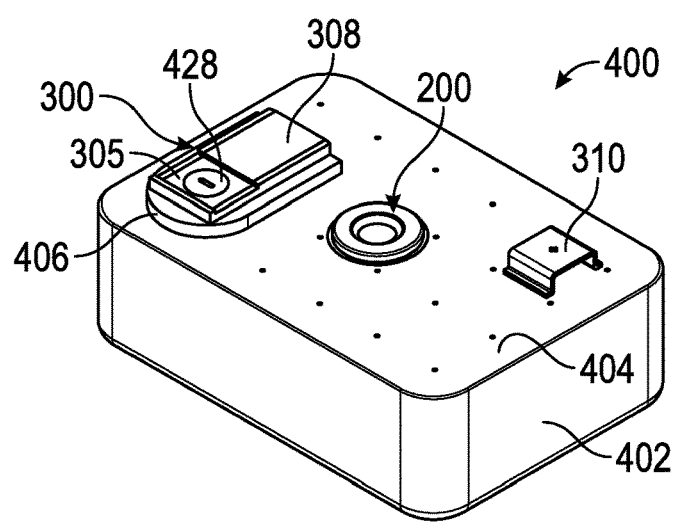
FIG. 9A is an assembled view of the exemplary multi-core lithium ion battery of FIG. 9 according to the present disclosure.

Upstanding terminal 115 is in electrical communication with a conductive element 313 that includes or defines a fuse 304 and a terminal contact surface 305. Conductive element 313 is positioned within fuse holder 406 and is mounted external to top cover 404. Hammer head screw 428 secures conductive element 313 relative to fuse holder 406 and cooperates with conductive element 313 to define a substantially rectangular terminal contact surface, as shown in FIG. 9A. The conductive portions of conductive element 313, other than the exposed terminal contact surface 305, may be electrically isolated within the fuse holder 406 by fuse cover 308. Conductive element 313 rests on fuse holder hold down ring 426, which rests in a cavity on the exposed face of fuse holder 406.

With further reference to PDD assembly 300, a conductive dome 312 is positioned in and mounted with respect to a further opening 414 defined on surface 416 of top cover 404, e.g., by welding of a peripheral edge of dome 312 to top cover 404. Dome 312 is initially flexed inward relative to top cover 404, and is thereby positioned to respond to an increase in pressure within the casing defined by outer can 402 and top cover 404 by outward deflection thereof. Dome 312 is brought into direct contact with an underside of conductive element 313 and/or hammer head 428 based on pressure build-up within the assembly defined by outer can 402 and top cover 404, i.e., pressure build-up beyond a threshold pressure level.

In use and in response to a build-up in pressure within the assembly defined by outer can 402 and top cover 404, dome 312 will deflect upward relative to the plane defined by surface 416 of top cover 404. Upon sufficient upward deflection—i.e., based on the internal pressure associated with battery 400 reaching a threshold level—dome 312 is brought into direct contact with an underside of conductive element 313 and/or hammer head 428. Contact with conductive element/hammer head 428 (which are conductive) completes a circuit that runs from top cover 404 thru dome 312, hammer head 428, conductive element 313, fuse 304, and upstanding terminal 115. The completion of this circuit will cause fuse 304 to "blow", thereby breaking the circuit from the multi-core components positioned within the assembly defined by outer can 402 and top cover 404. Current is bypassed through the casing defined by outer can 402 and top cover 404. Of note, all operative components of PDD assembly 300 other than dome 312 are advantageously positioned external to the outer can 402/top cover 404 and dome 312 is advantageously mounted with respect to an opening 418 defined in top cover 404.

A substantially U-shaped terminal 310 with mounting flanges 311 is mounted in an opposing corner region of top cover 404, relative to surface 416. Terminal 310 is typically fabricated from aluminum and functions as the cathode for battery 400. Terminal 310 may take various geometric forms, as will be readily apparent to persons skilled in the art.

The multi-core design and assembly of battery 400 permits flexibility in the positioning of vent assembly 200 and PDD assembly 300 relative to outer can 402 and top cover 404 thereof. Thus, as shown in FIGS. 5-8, a battery design is provided in which the vent and PDD assemblies are both mounted relative to a top wall of the outer can 102, whereas in FIG. 9, a battery design is provided in which the vent and PDD assemblies are both mounted relative to a top cover 404 that is, in turn, mounted with respect to outer can 402. The flexibility in positioning is permitted, at least in part, by the multi-core design of the disclosed lithium ion batteries in which the electrochemical units/jelly rolls are not individually sealed, but instead are open/unsealed and communicate with a shared head space/atmosphere region. The overall internal volume of the casing thus experiences an increase in internal pressure that may result from a failure of any of the electrochemical units/jelly rolls positioned therewithin, and the vent assembly/PDD assembly may be located at any convenient location provided only that the vent assembly/PDD assembly will be able to sense and respond to pressure increases in the shared atmosphere therewithin. In addition, the vent assembly and PDD assembly need not be positioned on the same surface of the casing, as illustrated below with reference to FIGS. 11 and 11A.

Figure 10:
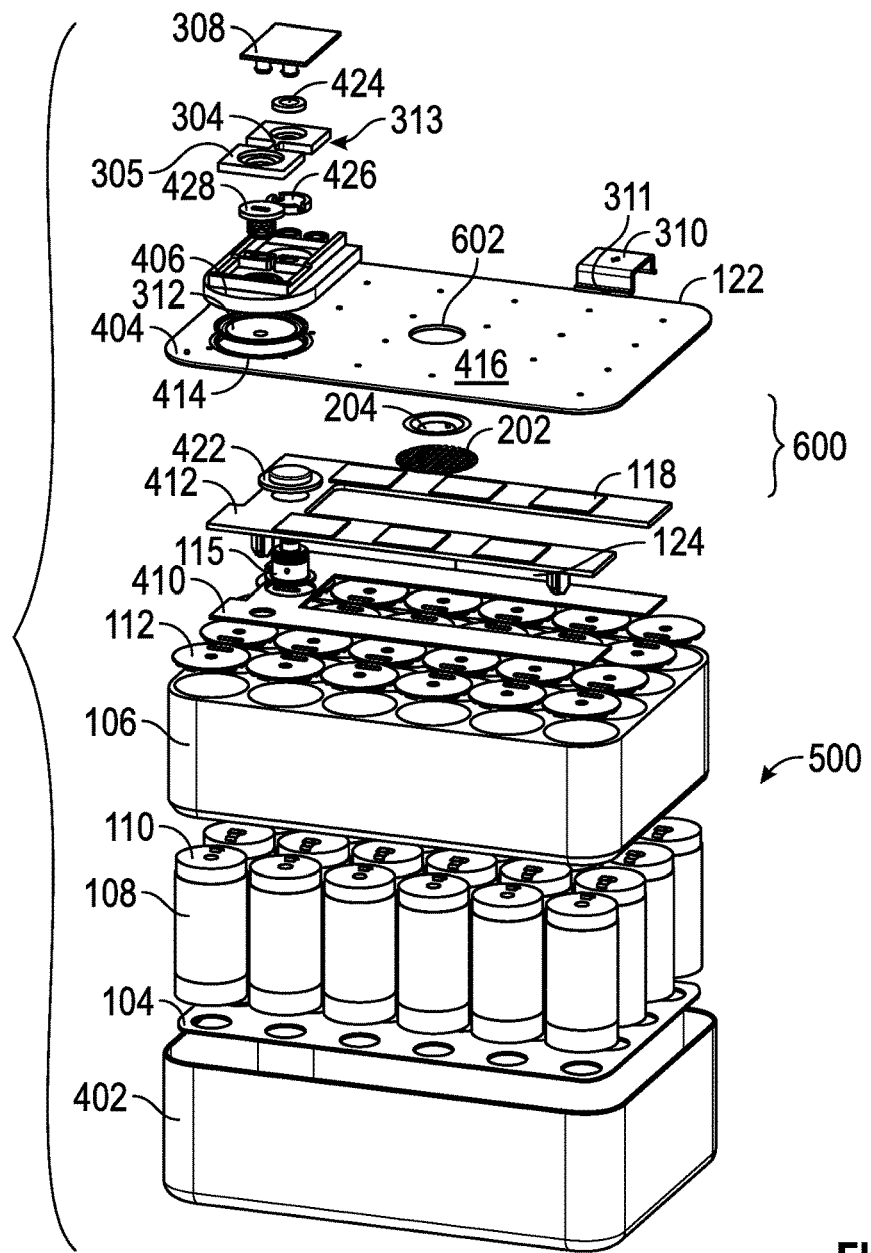
FIG. 10 is an exploded view of an exemplary multi-core lithium ion battery according to the present disclosure.

With reference to FIG. 10, a further exemplary battery assembly 500 is provided that is substantially similar to battery assembly 400 described with reference to FIGS. 9 and 9A. However, vent assembly 600 differs from vent assembly 200 described with reference previous exemplary embodiments.

Figure 10A:
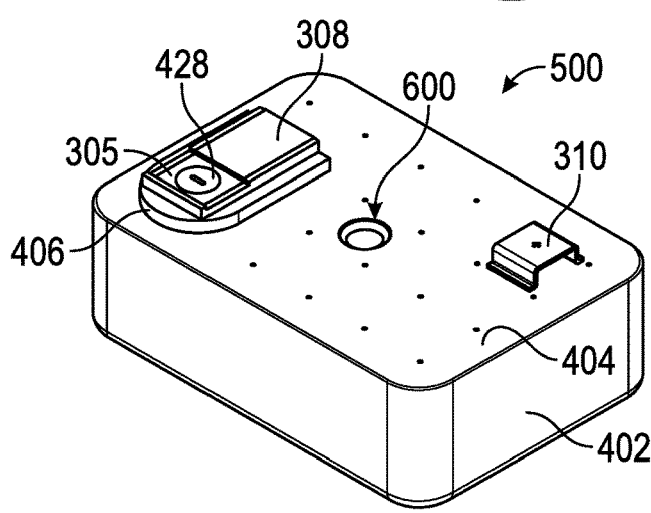
FIG. 10A is an assembled view of the exemplary multi-core lithium ion battery of FIG. 10 according to the present disclosure.

An assembled view of the exemplary lithium ion battery with alternate vent assembly 600 is provided in FIG. 10A. Vent assembly 600 is mounted axial to opening 602 and beneath surface 416 of top cover 404. Vent adapter ring 206, illustrated in FIGS. 5, 6 and 9, has been eliminated; and flame arrestor 202 and vent disc 204 are attached beneath surface 416 of top cover 404 via other installation methods, e.g., welding, adhesive, mechanical mounting structures, and the like (including combinations thereof). Of note, vent disc 204 is necessarily sealingly engaged relative to surface 416 and may be formed in situ, e.g., by score line(s) and/or reduced thickness relative to surface 416, as is known in the art. The functionality of vent assembly 600 is no different from that of vent assembly 200, described above.

Figure 11:
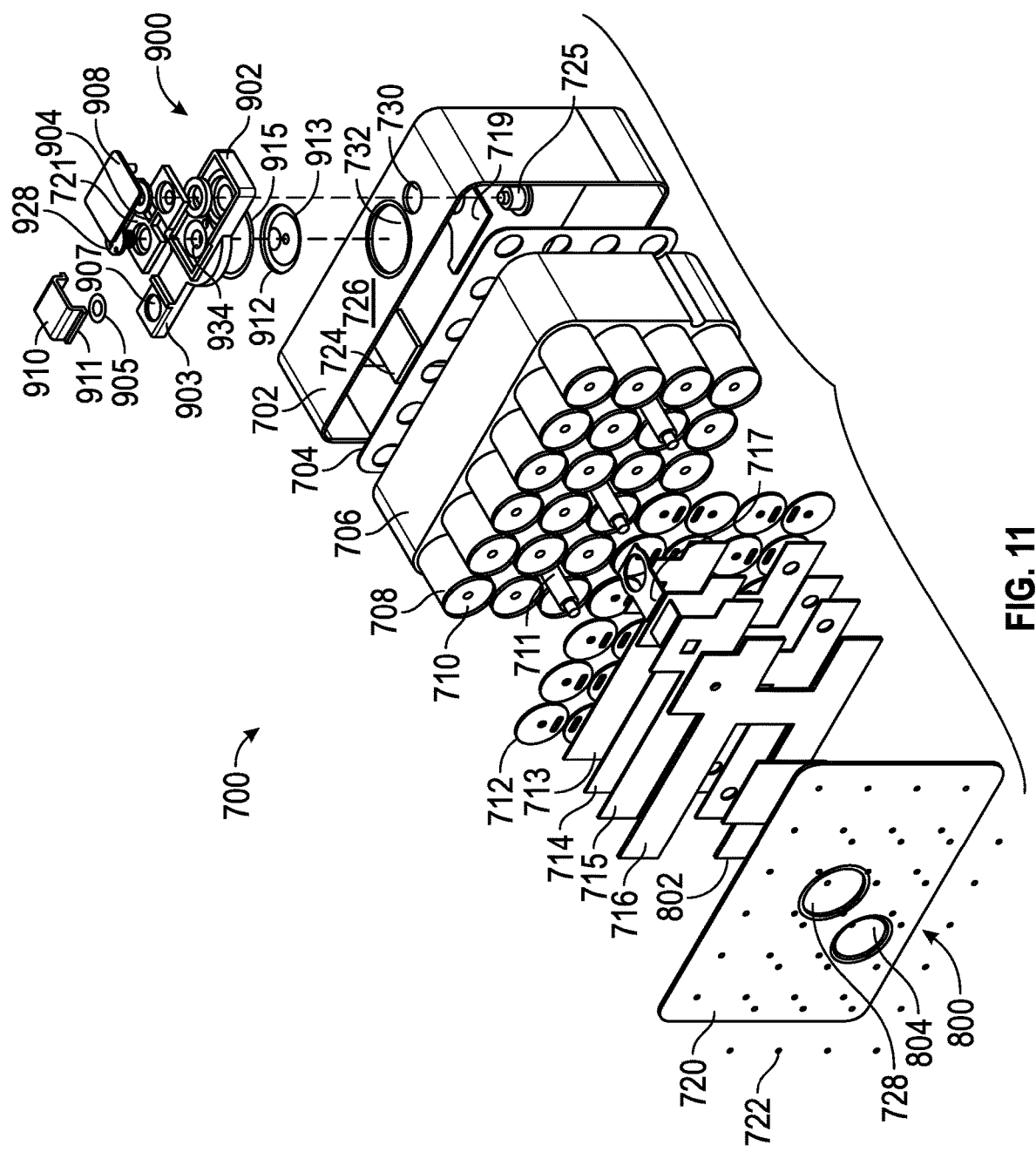
FIG. 11 an exploded view of a further exemplary multi-core lithium ion battery according to the present disclosure.
Figure 11A:
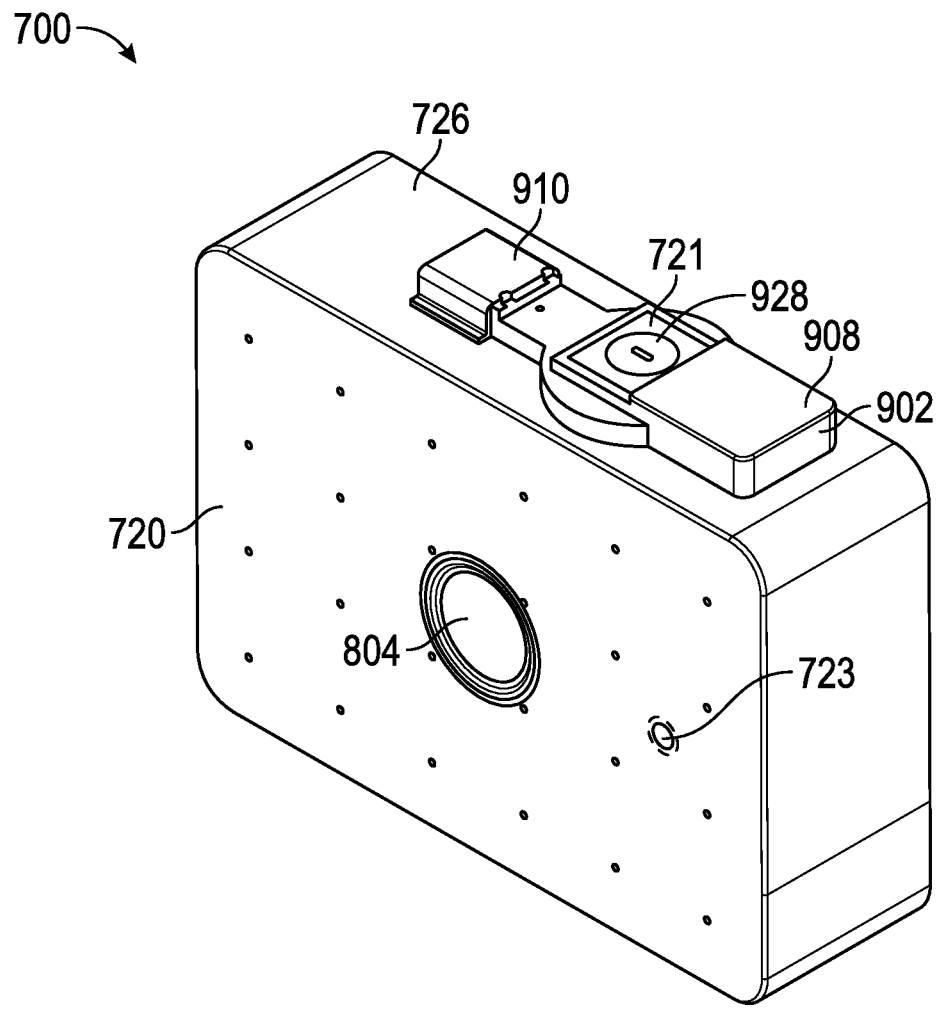
FIG. 11A is an assembled view of the exemplary multi-core lithium ion battery of FIG. 11 according to the present disclosure.

Turning to FIGS. 11 and 11A, a further exemplary battery 700 according to the present disclosure is schematically depicted. Battery 700 includes an outer can or casing 702, that defines an interior region for receipt of components, as follows:

An aluminum bus bar 704 that defines a plurality (24) of openings (e.g., circular openings);

A housing or support structure 706 that defines a plurality (24) of spaced, substantially cylindrical regions or cavities that are configured and dimensioned to receive jelly roll/jelly roll sleeve subassemblies;

A plurality (24) of jelly roll sleeves 708 configured and dimensioned to receive corresponding jelly rolls and to be positioned within the cylindrical regions defined by housing 706—the jelly roll sleeves 708 may be fabricated of various materials, e.g., polymers or metals, and may take the form of polymer and metal foil laminated foil pouches;

A plurality (24) jelly rolls 710, i.e., electrochemical units, configured and dimensioned to be positioned within jelly roll housings 708;

A plurality (24) jelly roll covers 712 that are configured and dimensioned to cover the jelly rolls 710 positioned within the cavities defined by housing 706;

A copper bus bar 714 that defines a substantially H-shaped geometry so as to effect electrical communication with each of the jelly rolls 710;

A bus bar insulator 716 that defines a geometry that generally corresponds to the geometry of bus bar 714 so as to insulate the bus bar 714 relative to the top cover of the battery assembly;

Insulation tape 713 and 715, e.g., polyimide tape, that provides further heat resistant insulation above and below copper bus bar 714;

A substantially rectangular top cover 720 that is configured and dimensioned to cooperate with the outer can 702 to encase the foregoing components therewithin;

A plurality (3) of supports or pillars 711 that extend from housing 706 and that cooperate with top cover 720 to provide support/bracing therebetween—supports 711 may be fixed relative to top cover 720 in various ways, e.g., threading engagement, welding securement, simply interference fit relative to a corresponding aperture, and the like; one of the points of connection relative to top cover 720 is shown in phantom as 723;

A plurality (24) of steel balls 722 positioned on the exterior of the top cover 720 to obstruct openings formed in the top cover 120 to facilitate electrolyte introduction to the jelly rolls;

One or more anti-vibration mats 724 are positioned between the outer can 702 and the outer wall(s) of housing 706 to further dampen vibration and prevent movement therebetween.

The corners of the outer can/casing 702, bus bar 704, housing 706 and top cover 720 are generally radiused at their respective corners to minimize size and facilitate manufacture/assembly. The jelly rolls 710 positioned within housing 706 define a multi-core assembly that generally share headspace within outer can 702 and top cover 720, but do not communicate with each other side-to-side. Thus, any build-up in pressure and/or temperature associated with operation of any one or more of the jelly rolls 710 will be spread throughout the shared headspace and will be addressed, as necessary, by the safety features described herein below. However, electrolyte associated with a first jelly roll 710 does not communicate with an adjacent jelly roll 710 because the substantially cylindrical regions defined by housing 706 isolate jelly rolls 710 from each other from a side-to-side standpoint. The sleeves 708 further contribute to the side-to-side electrolyte isolation as between adjacent jelly rolls 710.

Exemplary safety features associated with the disclosed lithium ion battery 700 include a vent assembly 800 and a pressure disconnect device (PDD) assembly 900. Unlike the exemplary battery designs described with reference to FIGS. 5-10, operative components of the vent assembly 800 and the PDD assembly 900 are not mounted/positioned relative to the same outer surface of the battery casing, e.g., on a top wall 126 of outer can 102 of battery (as shown in FIGS. 5-8) or top cover 404 of battery (as shown in FIG. 10), but instead are deployed on different outer surfaces of the battery casing.

With initial reference to vent assembly 800, top cover 720 defines an opening 728. A flame arrestor 802 and a vent disc 804 are mounted across the opening 728. A seal is maintained in the region of flame arrestor 802 and vent disc 804, e.g., by a vent adapter ring (not pictured). Various mounting mechanisms may be employed to fix the structures associated with vent assembly 800 relative to top cover 720, e.g., welding, adhesive, mechanical mounting structures, and the like (including combinations thereof). Of note, vent disc 804 is necessarily sealingly engaged relative to top cover 720 and may be formed in situ, e.g., by score line(s) and/or reduced thickness relative to top cover 720, as is known in the art.

In the event of a failure of an individual jelly roll (or multiple jelly rolls), a large amount of gas may be generated (~10 liters), and this gas is both hot (~250-300° C.) and flammable. It is likely that this gas will ignite outside of the multi-jelly roll enclosure after a vent occurs. To prevent the flame front from entering the casing, a mesh may be provided to function as flame arrestor 802 and may be advantageously placed or positioned over the vent area, i.e., opening 728. This mesh functions to reduce the temperature of the exiting gas stream below its auto-ignition temperature. Since the mesh is serving as a heat exchanger, greater surface area and smaller openings reject more heat, but decreasing the open area of the mesh increases the forces on the mesh during a vent.

Upstanding copper terminal 725 which functions as the anode for the disclosed lithium ion battery and is configured and dimensioned to extend upward thru an opening 730 formed in the top wall 726 of outer can or casing 702. The upstanding terminal 725 is in electric communication with the copper bus bar 714 and bus bar connector 717 internal to the casing 702, and extends thru bus bar connector insulator 719 so as to be exposed upward and outward of outer can/casing 702. The upper end of upstanding copper terminal 725 is positioned within fuse holder 902, which may define a substantially rectangular, non-conductive (e.g., polymeric) structure that is mounted along the top wall 726 of outer can/casing 702. Upstanding terminal 725 is in electrical communication with terminal contact face 721 by way of fuse 904.

Fuse 904 is positioned within fuse holder 902 and external to outer can/casing 702 in electric communication with upstanding copper terminal 725 and terminal contact face 721. The fuse components may be electrically isolated within the fuse holder 902 by fuse cover 908.

A substantially U-shaped terminal 910 defines spaced flange surfaces 911 that are in electrical and mounting contact with the top wall 726 of outer can/casing 702. In exemplary embodiments, terminal 910 is positioned over an extension 903 of fuse holder 902 that facilitates positioning of terminal 910. A conventional O-ring 905 may be received within an aperture formed in the extension 903 to dampen potential vibration/movement of fuse holder 902 relative to top wall 726. O-ring 905 may be received in an aperture 907 formed in extension 903 such that O-ring engages the surface of top wall 726 and establishes a stable relationship between fuse holder 902 and top wall 726.

Aluminum bus bar 704 which is internal to casing 702 is in electrical communication with the outer can/casing 702, thereby establishing electrical communication with terminal 910. Terminal 910 may take various geometric forms, as will be readily apparent to persons skilled in the art. Terminal 910 is typically fabricated from aluminum and functions as the cathode for the disclosed lithium ion battery 700. Thus, the anode terminal contact face 721 and cathode terminal 910 are positioned in a side-by-side relationship on the top wall 726 of casing 702 and are available for electrical connection, thereby allowing energy supply from battery 700 to desired application(s).

With reference to exemplary PDD assembly 900, a conductive dome 912 is positioned with respect to a second opening 732 defined in the top wall 726 of outer can/casing 702. Dome 912 defines a region of increased cross-sectional thickness central thereto. Thus, in an exemplary embodiment, a conductive film disc 913 is applied to a central region of dome 912, e.g., by welding or other adherence method, thereby increasing the cross-sectional dimension of the dome 912 in such central region.

Dome 912 is initially flexed inward relative to the outer can/casing 702, and is thereby positioned to respond to an increase in pressure within the outer can by outward/upward deflection thereof. Dome 912 may be mounted with respect to top wall 726 by a dome adapter ring which is typically welded to the periphery of dome 912 and then further welded with respect to top wall 726 to fix the periphery of dome 912 relative to top wall 726. A sealing O-ring 915 may be included to provide an enhanced seal in the region of interface between fuse holder 902 and dome 912.

Figure 12A:
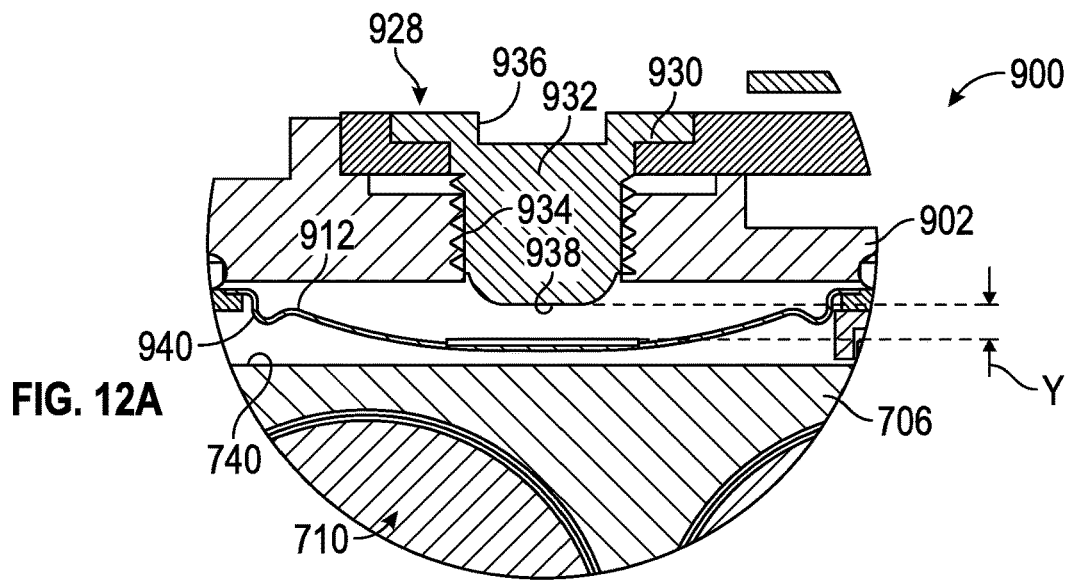
FIGS. 12A-12C are three (3) schematic side views that show progression of a deflectable dome in response to a pressure increase within a casing according to an exemplary embodiment of the present disclosure.
Figure 12B:
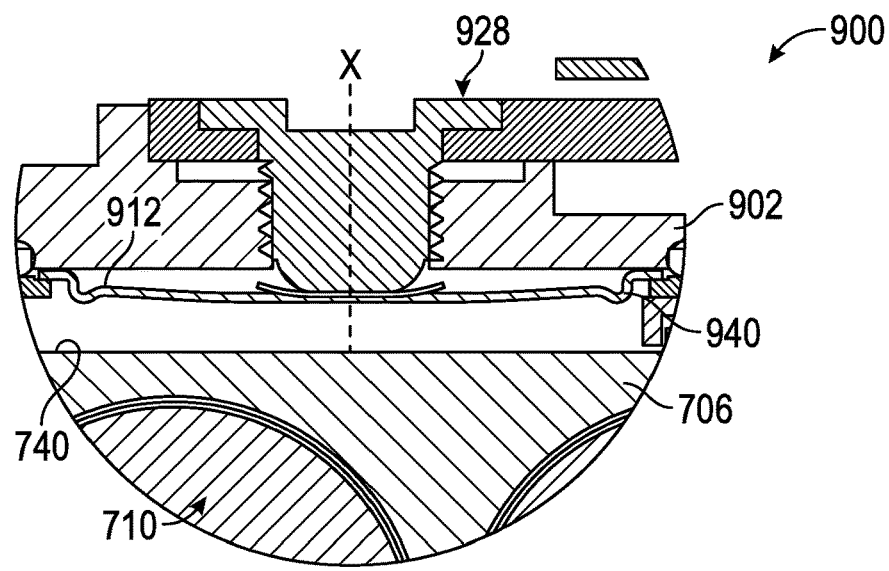
Figure 12C:
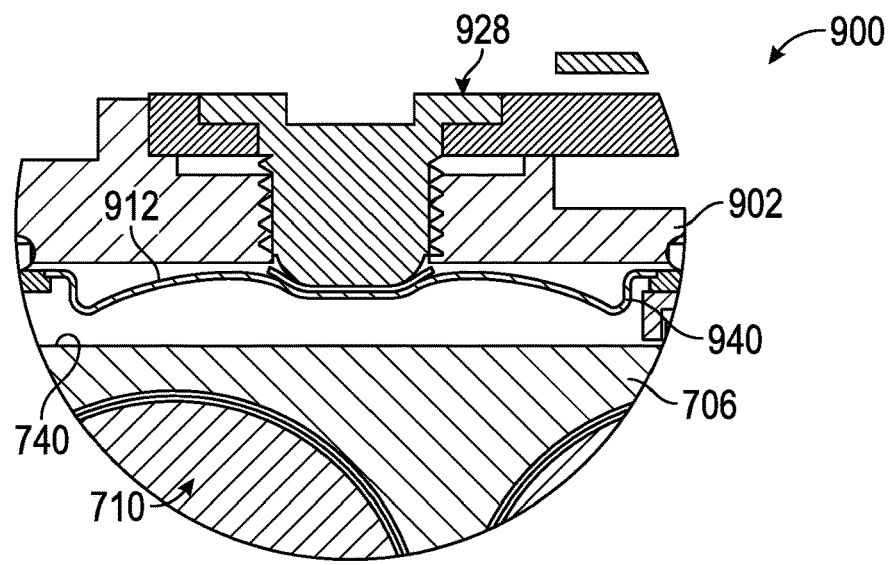

With reference to FIGS. 12A-12C, additional features and functions of PDD 900, including exemplary specifically dome 912 and hammer head 928, are described according to the present disclosure Hammer head 928 defines a circumferential flange or head region 930 and a threaded shank 932 extending therefrom. The threaded shank 932 is adapted to engage corresponding threads formed in an aperture 934 defined in fuse holder 902. Head region 930 cooperates with terminal contact face 721 to define a substantially flush upper face thereof. A drive feature 936 is defined on the head region 930 to facilitate interaction with a tool, e.g., a screw driver or the like, to threadingly engage hammer head 928 relative to aperture 932. Once threaded into place, hammer head 928 is securely held in the desired position relative to dome 912, thereby ensuring reliable and exacting electrical contact between dome 912 and hammer head 928 when pressure conditions within the battery casing activate the dome 912.

In the assembled condition shown in FIGS. 12A-12C, the distal face 938 of hammer head 928 advantageously extends beyond the underside of fuse holder 902. The central axis of hammer head 928 (shown as dashed line "X" in FIG. 12B) is substantially aligned with the center of circular dome 912. In the initial position of FIG. 12A, dome 912 is bowed away from the distal face 938 of hammer head 928. This relative orientation reflects a condition wherein the pressure within the volume bounded by can 702 and top cover 720 is within normal operating ranges, i.e., not at an elevated level such that a deflection response of dome 912 has been initiated. The pressure associated with normal operating condition of a lithium ion battery according to the present disclosure will vary depending on many factors, including the power/energy capacity of the battery, the number of jelly rolls/electrochemical units positioned within the casing, the volume of the shared atmosphere region, the composition of the electrolyte (including specifically the type and level of degassing agent).

In typical lithium ion battery implementations of the present disclosure wherein the battery capacity is 30 Amp-hours or greater, operating pressures under normal conditions are between 0 and 5 psig. Accordingly, operating pressures of between 10 psig and 70 psig may be deemed acceptable for PDD activation, although lower pressure ranges, e.g., pressures in the range of 10 psig to 30 psig, may be deemed acceptable pressure operating ranges in exemplary implementations of the present disclosure. The PDD of the present disclosure is designed so as to be responsive to a selected pressure (or limited pressure range) within the casing of the battery, e.g., 20 psig±0.1 psig or the like. Of note, the PDD activation pressure may be selected at least in part to ensure that the temperature within the battery casing does not exceed acceptable levels, e.g., an internal temperature that does not exceed 110° C. to 120° C. If the internal temperature is permitted to exceed about 110° C. to 120° C., significant issues may arise that could lead to internal short(s) of the jelly roll(s)/electrochemical unit(s) (e.g., based on separator shrinkage or rupturing) and/or thermal runaway. According to the present disclosure, activation of the disclosed PDD at the predetermined pressure threshold is generally effective to prevent against thermal runaway and other potentially catastrophic failure conditions.

In particular and in exemplary embodiments of the present disclosure, when the internal pressure reaches the PDD threshold value, the dome disc pops up to contact the hammer head causing a short circuit between positive and negative terminals, which results in fuse failure. After the fuse has failed (i.e., "blown"), the negative terminal connecting to the external circuit is isolated from jelly rolls in the container, and the negative terminal is kept connecting to the positive terminal via the case and hammer head, resulting in current directly flowing from the negative terminal to the case, i.e., by-passing jelly rolls.

Figure 13:
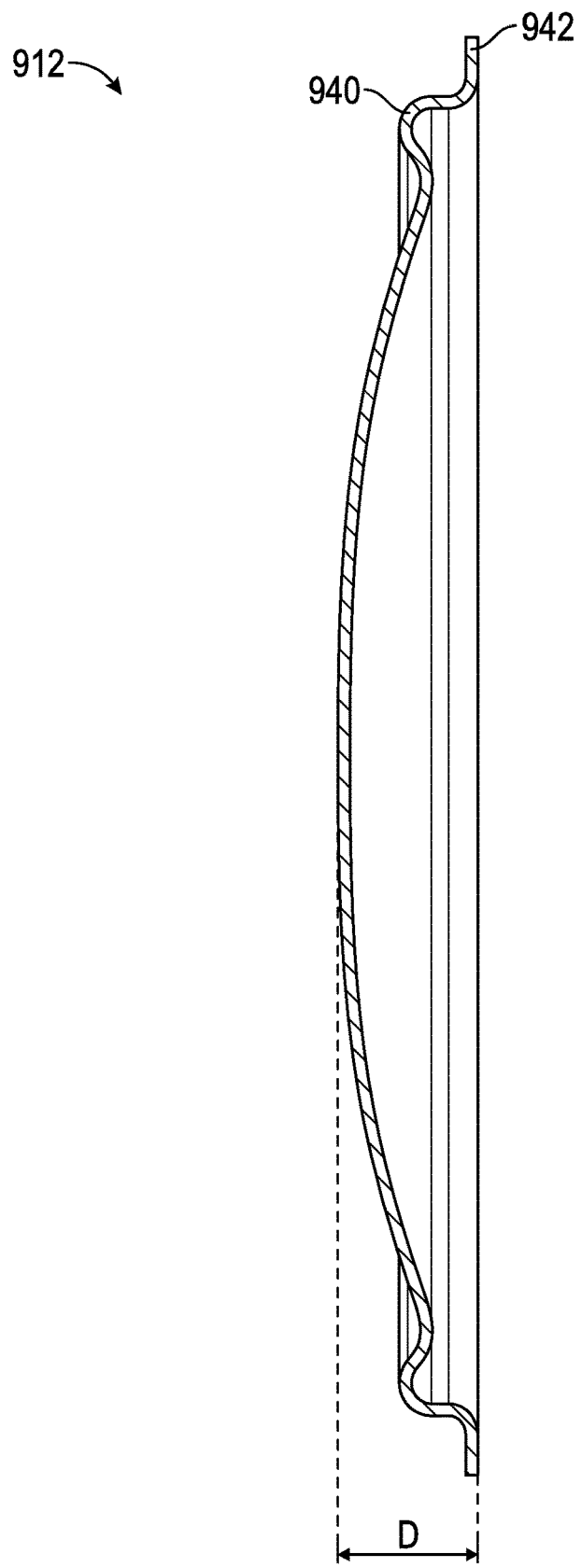
FIG. 13 is a sectional side view of an exemplary deflectable dome according to the present disclosure.

In an exemplary embodiment of the present disclosure, and as shown in the cross-section of FIG. 13, dome 912 (prior to addition of conductive film disc 913) may include or define a circumferential groove 940 at an outer periphery thereof (but internal of circumferential mounting flange 942). The groove 940 facilitates response of dome 912 to internal pressures developed within the battery casing.

In an exemplary embodiment of the present disclosure where dome 912 is fabricated from aluminum such that the central region thickness is about 0.015 to 0.022 inches (with or without film disc 913), the diameter of dome 912 (exclusive of mounting flange region 942) is about 1.18 inches, and the diameter of dome 912 internal of groove 940 is about 1.03 inches, the radius of the distal face 938 of hammer head 928 is about 0.06 to 0.08 inches, and the activation pressure is about 20 to 25 psig, the distance "D" from the top face of mounting flange 942 to the surface of dome 912 at a center point thereof once the film disc 913 (diameter of about 0.404 inches) is applied to the central region of dome 912 (not shown in FIG. 13) is about 0.115 inches to about 0.123 inches.

Of note, as shown in FIGS. 12A-12C, the distal face 938 of hammer head 928 extends below the plane defined by the lower face of fuse holder 902, thereby closing the gap between such distal face 938 and the central region of dome 912. The initial distance "Y" between the distal face 938 of hammer head 928 and the central region of dome 912 (with film disc 913 applied thereto) is approximately 0.063 inches. Thus, the downward extension of hammer head 928 relative to the lower face of fuse holder 902 reduces the required travel distance for dome 912 to contact hammer head 928 and complete an electrical circuit therewith. The initial spacing distance "Y" will vary depending on the specifics of a PDD design based on such factors as the operating pressures to be accommodated within the battery, the design parameters of dome 912 and the pressure at which PDD 900 is to be activated.

Once a pressure that meets or exceeds the predetermined pressure threshold is reached within the battery casing, the sequence schematically depicted in FIGS. 12B and 12C commences according to an exemplary embodiment of the present disclosure. With reference to the inversion progression of dome 912 in response to an elevated pressure within the battery casing defined by outer can and top cover, dome 912 will deflect upward relative to the distal face 938 of hammer head 928. As shown in FIG. 12B, upon sufficient upward deflection—i.e., based on the internal pressure associated with the battery reaching a threshold level—the central region of dome 912 is brought into direct physical contact with the distal face 938 of hammer head 928. The travel distance required to place dome 912 and hammer head into initial contact is equal to the initial spacing distance "Y". However, to ensure consistent, continuous and wide area contact over the entirety of the distal face 938 of hammer head 928, the dome 912 is configured and dimensioned to undergo a minimum travel distance of at least about 0.02 inches greater than the initial spacing distance "Y" when inversion is complete, e.g., as shown in FIG. 12C. Thus, for example, where initial spacing distance "Y" is about 0.063 inches as described above, the minimum travel distance of dome 912 when fully inverted is at least about 0.083 inches. This minimum travel distance is thus on the order of at least about 120% to 140% of the initial spacing distance "Y". The "interference" established by the fact that the minimum travel distance of dome 912 exceeds the initial spacing distance "Y" helps to ensure a positive electrical connection in the short circuit mode that enables reliable current bypass from the battery, and minimizes the potential for undesirable temperature increases associated with discharge current.

As shown in FIG. 12C, full inversion of dome 912 causes dome 912 to deform around the distal face 938 of hammer head 928, thereby further ensuring consistent, continuous and wide area contact of dome 912 relative to hammer head 928. As will be apparent to persons skilled in the art, a more complete and reliable electrical contact between dome 912 and hammer head 928 reduces the likelihood of burn through of the dome 912, as well as the disadvantageous potential for electrical surges/pulses due to intermittent contact that can increase the likelihood of temperature rise and thermal runaway of electrochemical units and/or electrolyte. The presence of film disc 913 or other thickening of the central region of dome 912 further enhances the consistent, continuous and wide area contact between dome 912 and hammer head 928.

With further reference to FIGS. 12A-12C, it is noted the physical proximity and relationship of PDD 900 relative to support structure 706 and jelly rolls/electrochemical units 710. As schematically depicted in FIGS. 12A-12C, the side wall 740 of support structure 706 is spaced from the underside of fuse holder 902 in a defined manner, such that the space required for positioning and operation of dome 712 is clearly established and maintained. Thus, a minimum of space need be devoted to accommodating dome 712, thereby permitting maximal packing density for the electrochemical units 710 without sacrificing PDD operation. The volume within which dome 712 moves constitutes a shared atmosphere region for the unsealed electrochemical units positioned in support structure 706. As a result of the shared atmosphere region and the relatively large space available for positioning and operation of dome 712, the disclosed PDD is able to operate effectively and reliably at relatively low pressures, e.g., as low as 10 psig, for batteries with capacities of 30 Ah and higher.

Still further, the PDD of the present disclosure may be designed for activation at a first pressure, e.g., 10 to 40 psig (or higher, depending on battery design), the vent assembly may be designed for activation (i.e., pressure release/venting) at a second pressure that is at least 5 to 10 psig higher than the activation pressure of the PDD, and the overall design of the battery casing (i.e., welds, seals, joints and the like) may be designed with a failure pressure rating that is at least 5 to 10 psig higher than the activation pressure of the vent assembly. In this way, the sequence for safety response of the battery design may be established so as to minimize risks associated with battery design and operation.

As is apparent from each of the disclosed battery systems, the PDD components and the vent structure of the present disclosure advantageously interact with and respond to conditions within the battery casing based on components that are mounted with respect to apertures/openings formed directly in the can or lid of the casing. For example, the disclosed dome is mounted with respect to an opening formed in the can itself in FIGS. 5, 6 and 11, while the disclosed dome is mounted with respect to an opening formed in the lid in FIGS. 9 and 10. Equally beneficially, the vent is mounted with respect to an opening formed directly in the can in FIGS. 5 and 6, while the disclosed vent is mounted with respect to an opening formed in the lid in FIGS. 9-11.

No intermediate or accessory structure is required to support the PPD and/or vent structures of the present disclosure. Indeed, only one additional opening relative to the interior of the battery is required according to the embodiments of the present disclosure, i.e., an opening to accommodate passage of the Cu terminal. The simplicity and manufacturing/assembly ease of the disclosed battery systems improves the manufacturability and cost parameters of the disclosed battery systems. Still further, the direct mounting of the PDD and vent assemblies relative to the can and/or lid of the disclosed batteries further enhances the low profile of the disclosed batteries. By low profile is meant the reduced volume or space required to accommodate the disclosed PDD and vent safety structures/systems, while delivering high capacity battery systems, e.g., 30 Ah and higher.

Mitigation of Arc Generation Relative to Dome in Exemplary Pressure Disconnect Devices To avoid a potential for dome disc burn-through that might create hole(s) due to arc generation when the dome is activated, two advantageous design options have been developed according to the present disclosure: (i) a thicker dome disc, and (ii) welding additional foil on the disc. The two options may be independently implemented, or they may be implemented in combination.

Both thickening of the dome disc and welding additional foil on the dome disc (thereby increasing mass in the region of the dome disc) have been shown to eliminate burn-through hole in the dome disc when applying 800 A DC current. The results of these tests are shown in Tables 1 & 2 set forth below.

TABLE 1

Dome disc in PDD subassembly after applying high DC current

| Dome material & thickness | Weld metal & thickness | Hammer radius | Activation pressure (psig) | Applied current (A) | Fuse | Dome damage |
|---|---|---|---|---|---|---|
| Al/0.012" | N/A | 0.025" | 20-25 | 800 | Littelfuse MIDI 200A | Big burn-through hole |
| Al/0.012" | N/A | 0.060" | 20-25 | 800 | | Small burn-through hole |
| Al/0.015" | N/A | 0.060" | 35 | 800 | | No burn-through |
| Al/0.012" | 0.004" Al | 0.060" | 20-25 | 800 | | No burn-through |
| Al/0.012" | 0.004" Al | 0.080" | 20-25 | 800 | | No burn-through |
| Al/0.012" | N/A | 0.025" | 20-25 | 800 | Cadenza | Big burn-through |
| Al/0.012" | 0.010" Al | 0.060" | 20-25 | 900 | | No burn-through |
| Al/0.012" | Cu tape (3M 1187) | 0.060" | 20-25 | 800 | Littelfuse MIDI 200A | No burn-through |

The effect of thickness and type of additional welding metal foil on dome disc popping pressure with different thickness Al foils and Cu foil welded on the Al dome disc has been investigated. Based on these studies and as shown in Table 2, the Al foil thickness or Cu foil thickness has no significant effect on dome popping pressure.

TABLE 2

Dome popping pressure with welded additional foil

| Additional foil material | Foil thickness (inch) | Dome popping pressure (psi) | | |
|---|---|---|---|---|
| | | Max | Min | Average |
| Al | 0.004 | 22 | 20 | 22 |
| Al | 0.010 | 22 | 20 | 21 |
| Al | 0.012 | 25 | 19 | 21 |
| Cu | 0.010 | 23 | 20 | 21 |
| Specification | N/A | 15 | 25 | 20 |

The additional metal foil can advantageously act as a sacrificial layer when an arc is generated, thereby protecting the dome disc from burning through. In addition, the larger thermal mass and lower resistance associated with the options disclosed herein beneficially reduces the local heat at the contact area between the hammer and dome disc. It is expected that the thicker and more conductive the foil is, the more effective the disclosed designs will be in preventing the arc from burning through.

In implementing designs to mitigate the risk of burn through when the dome is activated, i.e., when the disclosed pressure disconnect device is triggered, it is noted that the selection and use of different materials may be beneficially employed. For example, materials that exhibit a higher melting point may be advantageous because they will less readily burn through. Also, the electrical conductivity of the selected material may benefit the design and operation of the dome trigger, e.g., materials that exhibit greater electrical conductivity will more effectively/rapidly dissipate current from the dome region, thereby reducing the risk of burn through.

Indeed, the speed with which the dome (or other PDD trigger mechanism) responds to a pressure disconnect condition impacts on the degree to which the design must mitigate against potential burn through, i.e., the more quickly the dome/trigger responds, the less likely a burn through condition may occur (and vice versa). Thus, for a given PDD release pressure (e.g., 40 psi), a dome/trigger mechanism that is designed to respond at that pressure can be expected to respond at a certain speed based on its material(s) of construction, geometry, thickness/mass, etc. For a second PDD release pressure (e.g., 90 psi), a particular dome/trigger mechanism that is designed to respond at that pressure can be expected to respond at a potentially different speed based on its material(s) of construction, geometry, thickness/mass, etc. According to the present disclosure, the design of the dome/trigger mechanism may be selected (e.g., based on material(s) of construction, geometry, thickness/mass, etc.) so as to prevent burn through in view of the expected speed of PDD response.

Experimental Results

1. Overcharging Test of Cell with Pressure Disconnect Device a. Test procedures

Utilizing a lithium ion battery fabricated according to the design of FIG. 5, charge an 80 Ah cell that includes 24 jelly rolls to 100% state of charge (SOC) with a constant current of 16 A at room temperature to 4.2V, followed by constant voltage charge at 4.2V, and ending at current reaching 4 A. Record voltage and capacity.

Overcharge test: charge the cell with a constant current of 32 A. A thermocouple is placed in the center of cell. Terminate charging when the cell's SOC reached 200%.

Figure 14:
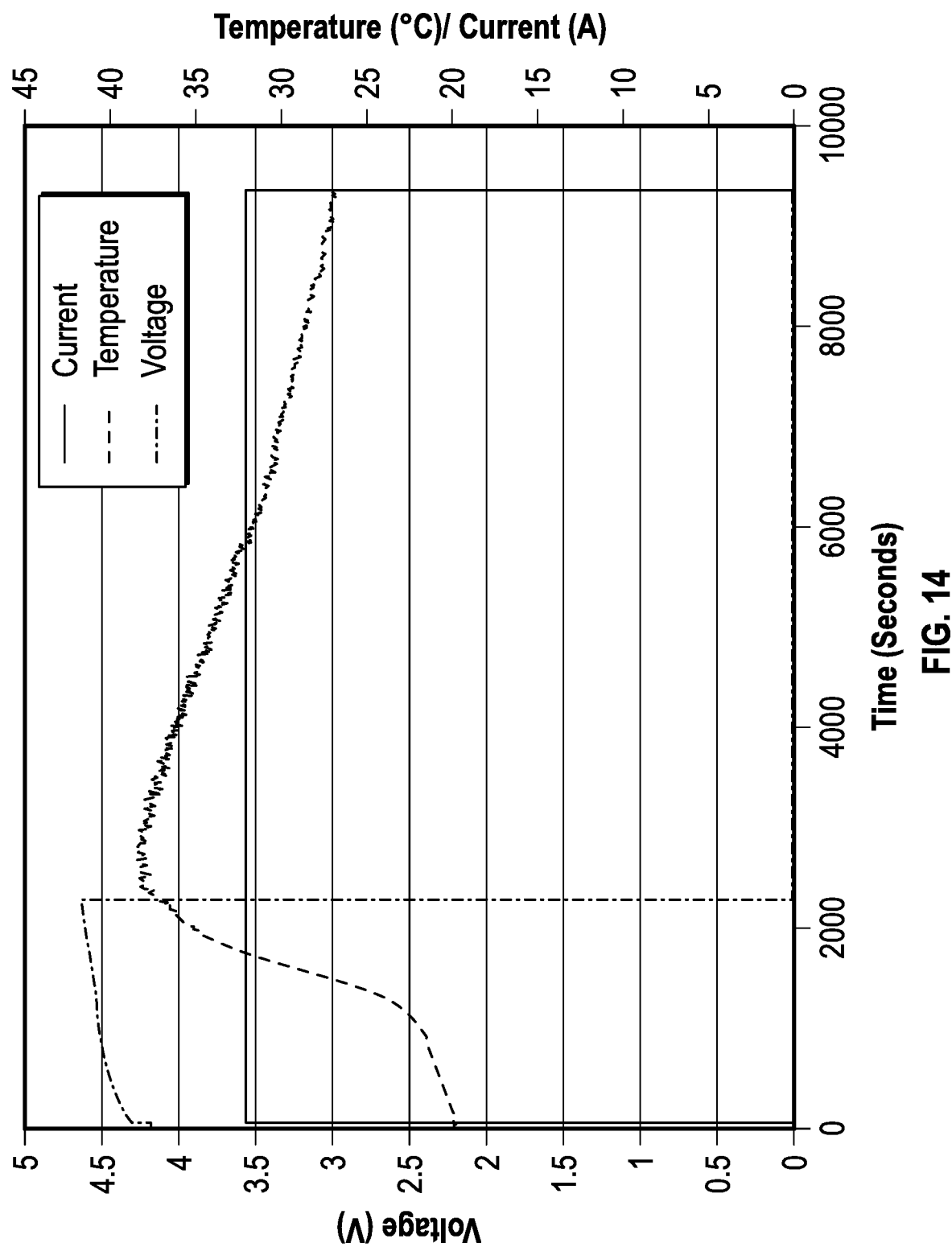
FIG. 14 is a plot of charge current, cell voltage and cell surface temperature for an experimental test according to the present disclosure.

The charge current, cell voltage and cell surface temperature variation during overcharging are plotted in FIG. 14.

b. Results

The pressure disconnect device was activated by system conditions at about 4.63V.

After PDD activation, the charge current was by-passing the cell.

The maximum cell surface temperature was 38° C. Except for the blown fuse, the cell exhibited no other changes. Thus, the PDD device functioned effectively to protect the cell from damage.

2. Test of Pressure Disconnect Device Assembly

Figure 15:
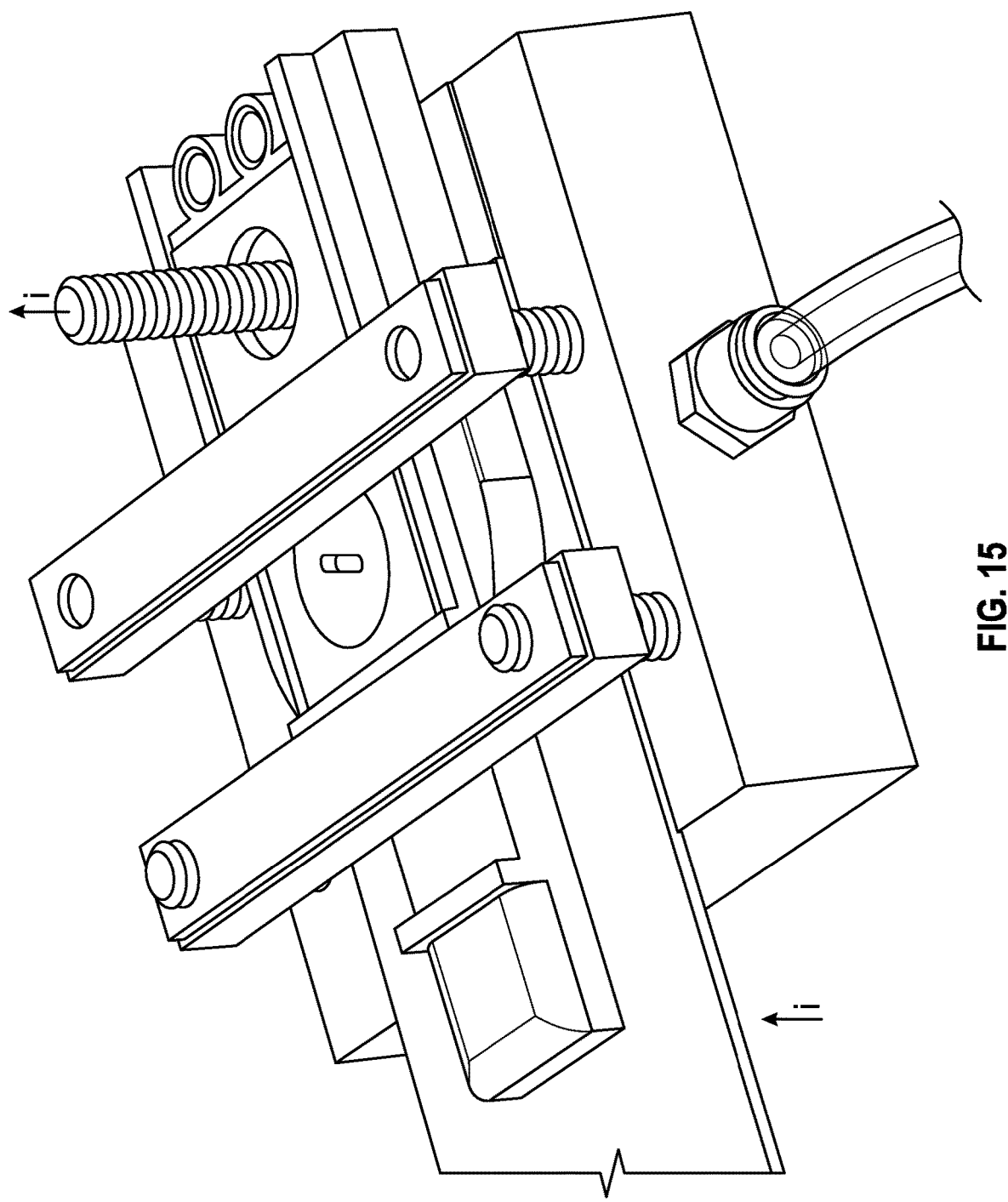
FIG. 15 is a schematic depiction of a test fixture used to test a pressure disconnect device according to the present disclosure.

The test setup is shown in FIG. 15 was utilized to test a pressure disconnect device according to the present disclosure. The pressure disconnect device assembly includes a pressure dome that is welded on an aluminum coupon, a hammer, a fuse and a fuse holder. The test fixture has an adaptor to adapt the pressure dome. A pre-determined pressure is applied through the pressure dome adaptor. A thermocouple is attached on the pressure dome near the edge of the hammer contact area. Current clamps are connected to the assembly and a 900 amp current is applied.

Figure 16:
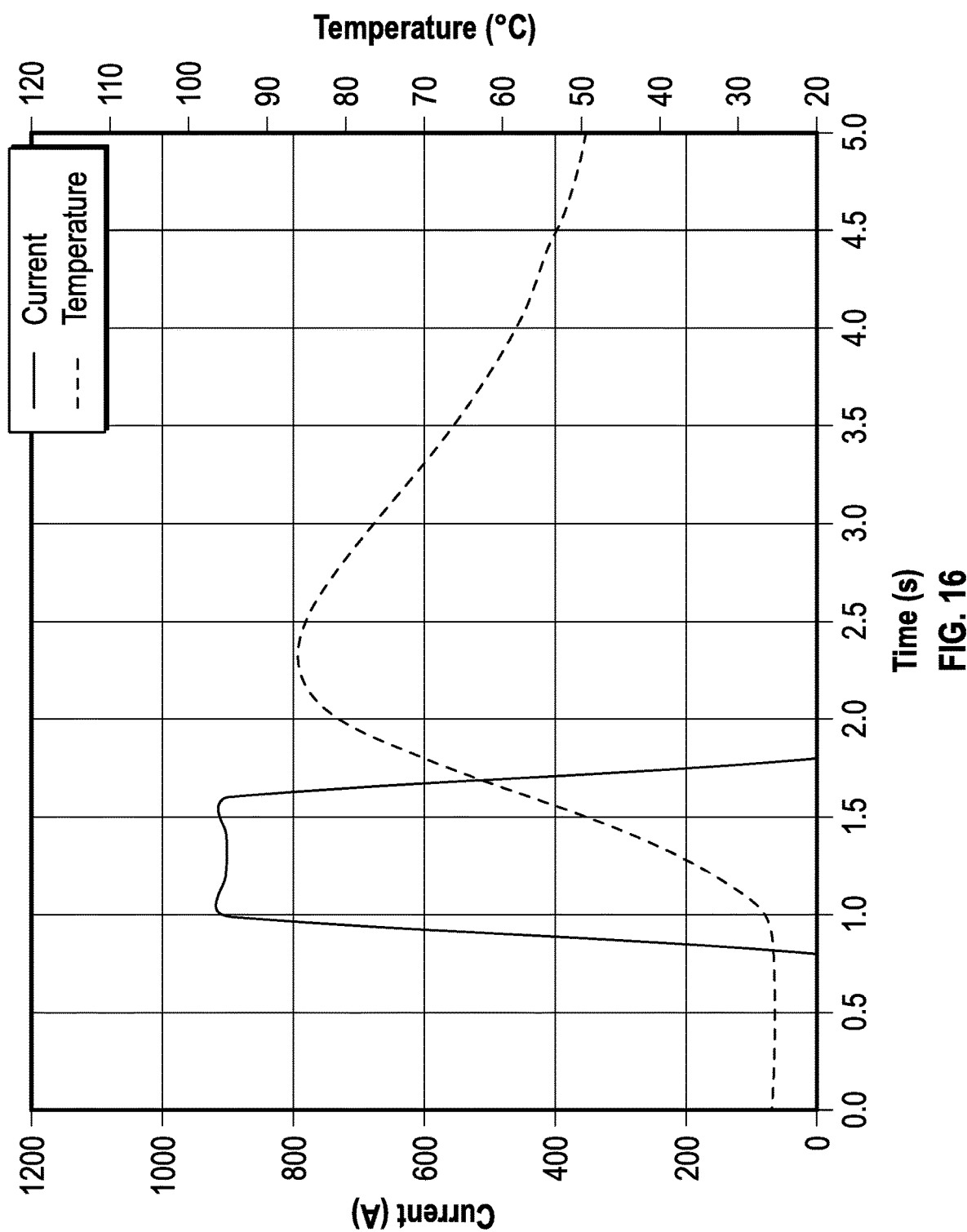
FIG. 16 is a plot of current and temperature variation during test of a pressure disconnect device assembly according to the present disclosure.

Apply pressure of 25 psi to activate the unit. The current and temperature variation during the test are plotted in FIG. 16. The fuse was blown approximately 0.6 seconds after the pressure dome activation. The maximum temperature measured at the pressure dome is about 86° C. Thus, the pressure disconnect device operated as desired, and would have been effective in protecting a cell if mounted with respect to a lithium battery as described herein.

Exemplary Multi-Core Lithium Ion Battery Systems/Assemblies

In exemplary implementations of the present disclosure, a vent structure is defined in the lid of a multi-core lithium ion battery container. If a vent pressure is reached, a substantially instantaneous fracture of the vent structure along the score line takes place, thereby releasing pressure/gas from the vent opening—and through the 30 mesh flame arrestor—as the vent structure deflects relative to the metal flap, i.e., the unscored region of the vent structure.

Advantageous multi-core lithium ion battery structures according to the present disclosure offer reduced production costs and improved safety while providing the benefits of a larger size battery, such as ease of assembly of arrays of such batteries and an ability to tailor power to energy ratios. The advantageous systems disclosed herein have applicability in multi-core cell structures and a multi-cell battery modules. It is understood by those skilled in the art that the Li-ion structures described below can also in most cases be used for other electrochemical units using an active core, such as a jelly roll, and an electrolyte. Potential alternative implementations include ultracapacitors, such as those described in U.S. Pat. No. 8,233,267, and nickel metal hydride battery or a wound lead acid battery systems.

In an exemplary embodiment, a lithium ion battery is provided that includes an assembly of multiple cores that are connected to a positive and negative current collector, originating from its anode and cathode electrodes. The lithium ion battery includes a plurality of jelly rolls, positive and negative current collectors, and a metal case. In one embodiment, the jelly roll has at least one bare current collector area welded directly onto a negative or positive bus bar, which is electrically joining multiple jelly rolls. In another embodiment, at least one of the bare current collector areas of the jelly rolls is directly welded onto a surrounding case structure, without using a bus bar for that connection. In this case, the case functions as the bus bar. This can be accomplished by either welding the rolls straight to the case, i.e., a metal can, or by using a sleeve structure, where a bottom fitted bus bar having welded jelly rolls is in turn welded onto the can structure. The bare anode current collector is generally Cu foil and the bare cathode current collector is generally Al foil for a Li-ion battery. The metal plate, which bare electrodes are welded onto, is referred to as the negative bus bar (or NBB), and the bar cathode connected bus bar end in the jelly roll is referred to as the positive bus bar (or PBB). In one embodiment, there are slit openings corresponding to the position of each individual jelly rolls of the NBB to allow an opening for electrolyte filling. This allows for some cases the electrolyte to be contained by the jelly roll itself and no additional electrolyte containing components, such as metal or plastic liners, are needed. In another exemplary embodiment, a single core electrochemical assembly is provided, where the NBB and PBB are welded onto the bare anode and cathode current ends in the jelly roll, respectively. A slit opening may be provided in the NBB. The assembly is inserted into a metal sleeve. The PBB may be welded onto the wall of the metal sleeve as the bottom of the metal case.

According to the present disclosure, exemplary multi-core lithium ion batteries are also described having a sealed enclosure with a support member disposed within the sealed enclosure. The support member includes a plurality of cavities and a plurality of lithium ion core members, disposed within a corresponding one of the plurality of cavities. There are a plurality of cavity liners, each positioned between a corresponding one of the lithium ion core members and a surface of a corresponding one of the cavities. The support member includes a kinetic energy absorbing material and the kinetic energy absorbing material is formed of one of aluminum foam, ceramic, and plastic. There are cavity liners formed of a plastic or aluminum material and the plurality of cavity liners are formed as part of a monolithic liner member. Instead of a plastic liner, also open aluminum cylindrical sleeves or can structures may be used to contain the core members. There is further included an electrolyte contained within each of the cores and the electrolyte includes at least one of a flame retardant, a gas generating agent, and a redox shuttle. Each lithium ion core member includes an anode, a cathode and separator disposed between each anode and cathode. There is further included an electrical connector within said enclosure electrically connecting the core members to an electrical terminal external to the sealed enclosure. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure.

In another aspect of the disclosure, the core members are connected in parallel or they are connected in series. Alternatively, a first set of core members are connected in parallel and a second set of core members are connected in parallel, and the first set of core members is connected in series with the second set of core members. The support member is in the form of a honeycomb structure. The kinetic energy absorbing material includes compressible media. The enclosure includes a wall having a compressible element which, when compressed due to a force impacting the wall, creates an electrical short circuit of the lithium ion battery. The cavities in the support member and their corresponding core members are one of cylindrical, oblong, and prismatic in shape. The at least one of the cavities and its corresponding core member may have different shapes than the other cavities and their corresponding core members.

In another aspect of the disclosure, the at least one of the core members has high power characteristics and at least one of the core members has high energy characteristics. The anodes of the core members are formed of the same material and the cathodes of the core members are formed of the same material. Each separator member may include a ceramic coating and each anode and each cathode may include a ceramic coating. At least one of the core members includes one of an anode and cathode of a different thickness than the thickness of the anodes and cathodes of the other core members. At least one cathode includes at least two out of the Compound A through M group of materials. Each cathode includes a surface modifier. Each anode includes Li metal or one of carbon or graphite. Each anode includes Si. Each core member includes a rolled anode, cathode and separator structure or each core member includes a stacked anode, cathode and separator structure.

In another aspect of this disclosure, the core members have substantially the same electrical capacity. At least one of the core members has a different electrical capacity as compared to the other core members. At least one of the core members is optimized for power storage and at least one of the core members is optimized for energy storage. There is further included a tab for electrically connecting each anode to the first bus bar and a tab for electrically connecting each cathode to the second bus bar, wherein each tab includes a means for interrupting the flow of electrical current through each said tab when a predetermined current has been exceeded. The first bus bar includes a fuse element, proximate each point of interconnection between the anodes to the first bus bar and the second bus bar includes a fuse element proximate each point of interconnection between the cathodes to the second bus bar, for interrupting the flow of electrical current through the fuse elements when a predetermined current has been exceeded. There is further included a protective sleeve surrounding each of the core members and each protective sleeve is disposed outside of the cavity containing its corresponding core member.

In yet another aspect of the disclosure, there are include sensing wires electrically interconnected with the core members configured to enable electrical monitoring and balancing of the core members. The sealed enclosure includes a fire retardant member and the fire retardant member includes a fire retardant mesh material affixed to the exterior of the enclosure.

In another embodiment, there is described a multi-core lithium ion battery that includes a sealed enclosure. A support member is disposed within the sealed enclosure, the support member including a plurality of cavities, wherein the support member includes a kinetic energy absorbing material. There are a plurality of lithium ion core members disposed within a corresponding one of the plurality of cavities. There is further included a plurality of cavity liners, each positioned between a corresponding one of the lithium ion core members and a surface of a corresponding one of the cavities. The cavity liners are formed of a plastic or aluminum material (e.g., polymer and metal foil laminated pouches) and the plurality of cavity liners may be formed as part of a monolithic liner member. The kinetic energy absorbing material is formed of one of aluminum foam, ceramic, and plastic.

In another aspect of the disclosure, there is an electrolyte contained within each of the cores and the electrolyte includes at least one of a flame retardant, a gas generating agent, and a redox shuttle. Each lithium ion core member includes an anode, a cathode and separator disposed between each anode and cathode. There is further included an electrical connector within the enclosure electrically connecting the core members to an electrical terminal external to the sealed enclosure. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure. The core members may be connected in parallel. The core members may be connected in series. A first set of core members may be connected in parallel and a second set of core members may be connected in parallel, and the first set of core members may be connected in series with the second set of core members.

In another aspect, the support member is in the form of a honeycomb structure. The kinetic energy absorbing material includes compressible media. The lithium enclosure includes a wall having a compressible element which, when compressed due to a force impacting the wall, creates an electrical short circuit of the lithium ion battery. The cavities in the support member and their corresponding core members are one of cylindrical, oblong, and prismatic in shape. At least one of the cavities and its corresponding core member may have different shapes as compared to the other cavities and their corresponding core members. At least one of the core members may have high power characteristics and at least one of the core members may have high energy characteristics. The anodes of the core members may be formed of the same material and the cathodes of the core members may be formed of the same material. Each separator member may include a ceramic coating. Each anode and each cathode may include a ceramic coating. At least one of the core members may include one of an anode and cathode of a different thickness as compared to the thickness of the anodes and cathodes of the other core members.

In yet another aspect, at least one cathode includes at least two out of the Compound A through M group of materials. Each cathode may include a surface modifier. Each anode includes Li metal, carbon, graphite or Si. Each core member may include a rolled anode, cathode and separator structure. Each core member may include a stacked anode, cathode and separator structure. The core members may have substantially the same electrical capacity. At least one of the core members may have a different electrical capacity as compared to the other core members. At least one of the core members may be optimized for power storage and at least one of the core members may be optimized for energy storage.

In another aspect of the disclosure, there is further included a tab for electrically connecting each anode to the first bus bar and a tab for electrically connecting each cathode to the second bus bar, wherein each tab includes a means/mechanism/structure for interrupting the flow of electrical current through each said tab when a predetermined current has been exceeded. The first bus bar may include a fuse element, proximate each point of interconnection between the anodes to the first bus bar and a fuse element and/or proximate each point of interconnection between the cathodes to the second bus bar, for interrupting the flow of electrical current through the fuse elements when a predetermined current has been exceeded. There may further be included a protective sleeve surrounding each of the core members and each protective sleeve may be disposed outside of the cavity containing its corresponding core member.

In another embodiment of the disclosure, sensing wires are electrically interconnected with the core members configured to enable electrical monitoring and balancing of the core members. The sealed enclosure may include a fire retardant member and the fire retardant member may include a fire retardant mesh material affixed to the exterior of the enclosure.

In another embodiment, a multi-core lithium ion battery is described which includes a sealed enclosure, with a lithium ion cell region and a shared atmosphere region in the interior of the enclosure. A support member is disposed within the lithium ion cell region of the sealed enclosure and the support member includes a plurality of cavities, each cavity having an end open to the shared atmosphere region. A plurality of lithium ion core members are provided, each having an anode and a cathode, disposed within a corresponding one of the plurality of cavities, wherein the anode and the cathode are exposed to the shared atmosphere region by way of the open end of the cavity and the anode and the cathode are substantially surrounded by the cavity along their lengths. The support member may include a kinetic energy absorbing material. The kinetic energy absorbing material is formed of one of aluminum foam, ceramic and plastic.

In another aspect, there are a plurality of cavity liners, each positioned between a corresponding one of the lithium ion core members and a surface of a corresponding one of the cavities. The cavity liners may be formed of a plastic or aluminum material. The pluralities of cavity liners may be formed as part of a monolithic liner member. An electrolyte is contained within each of the cores and the electrolyte may include at least one of a flame retardant, a gas generating agent, and a redox shuttle. Each lithium ion core member includes an anode, a cathode and separator disposed between each anode and cathode. There is an electrical connector within the enclosure electrically connecting the core members to an electrical terminal external to the sealed enclosure. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure.

In yet another aspect, the core members are connected in parallel or the core members are connected in series. Alternatively, a first set of core members are connected in parallel and a second set of core members are connected in parallel, and the first set of core members is connected in series with the second set of core members.

In another embodiment, a lithium ion battery is described and includes a sealed enclosure and at least one lithium ion core member disposed within the sealed enclosure. The lithium ion core member include an anode and a cathode, wherein the cathode includes at least two compounds selected from the group of Compounds A through M. There may be only one lithium ion core member. The sealed enclosure may be a polymer bag or the sealed enclosure may be a metal canister. Each cathode may include at least two compounds selected from group of compounds B, C, D, E, F, G, L and M and may further include a surface modifier. Each cathode may include at least two compounds selected from group of Compounds B, D, F, G, and L. The battery may be charged to a voltage higher than 4.2V. Each anode may include one of carbon and graphite. Each anode may include Si.

In yet another embodiment, a lithium ion battery is described having a sealed enclosure and at least one lithium ion core member disposed within the sealed enclosure. The lithium ion core member includes an anode and a cathode. An electrical connector within the enclosure electrically connects the at least one core member to an electrical terminal external to the sealed enclosure; wherein the electrical connector includes a means/mechanism/structure for interrupting the flow of electrical current through the electrical connector when a predetermined current has been exceeded. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure. The electrical connector may further include a tab for electrically connecting each anode to the first bus bar tab and/or for electrically connecting each cathode to the second bus bar, wherein each tab includes a means/mechanism/structure for interrupting the flow of electrical current through each tab when a predetermined current has been exceeded. The first bus bar may include a fuse element, proximate each point of interconnection between the anodes to the first bus bar, and the second bus bar may include a fuse element, proximate each point of interconnection between the cathodes to the second bus bar, for interrupting the flow of electrical current through the fuse elements when a predetermined current has been exceeded.

The present disclosure further provides lithium ion batteries that include, inter alia, materials that provide advantageous endothermic functionalities that contribute to the safety and/or stability of the batteries, e.g., by managing heat/temperature conditions and reducing the likelihood and/or magnitude of potential thermal runaway conditions. In exemplary implementations of the present disclosure, the endothermic materials/systems include a ceramic matrix that incorporates an inorganic gas-generating endothermic material. The disclosed endothermic materials/systems may be incorporated into the lithium battery in various ways and at various levels, as described in greater detail below.

In use, the disclosed endothermic materials/systems operate such that if the temperature rises above a predetermined level, e.g., a maximum level associated with normal operation, the endothermic materials/systems serve to provide one or more functions for the purposes of preventing and/or minimizing the potential for thermal runaway. For example, the disclosed endothermic materials/systems may advantageously provide one or more of the following functionalities: (i) thermal insulation (particularly at high temperatures); (ii) energy absorption; (iii) venting of gases produced, in whole or in part, from endothermic reaction(s) associated with the endothermic materials/systems, (iv) raising total pressure within the battery structure; (v) removal of absorbed heat from the battery system via venting of gases produced during the endothermic reaction(s) associated with the endothermic materials/systems, and/or (vi) dilution of toxic gases (if present) and their safe expulsion (in whole or in part) from the battery system. It is further noted that the vent gases associated with the endothermic reaction(s) dilute the electrolyte gases to provide an opportunity to postpone or eliminate the ignition point and/or flammability associated with the electrolyte gases.

The thermal insulating characteristics of the disclosed endothermic materials/systems are advantageous in their combination of properties at different stages of their application to lithium ion battery systems. In the as-made state, the endothermic materials/systems provide thermal insulation during small temperature rises or during the initial segments of a thermal event. At these relatively low temperatures, the insulation functionality serves to contain heat generation while allowing limited conduction to slowly diffuse the thermal energy to the whole of the thermal mass. At these low temperatures, the endothermic materials/systems materials are selected and/or designed not to undergo any endothermic gas-generating reactions. This provides a window to allow for temperature excursions without causing any permanent damage to the insulation and/or lithium ion battery as a whole. For lithium ion type storage devices, the general range associated as excursions or low-level rises are between 60° C. and 200° C. Through the selection of inorganic endothermic materials/systems that resist endothermic reaction in the noted temperature range, lithium ion batteries may be provided that initiate a second endothermic function at a desired elevated temperature. Thus, according to the present disclosure, it is generally desired that endothermic reaction(s) associated with the disclosed endothermic materials/systems are first initiated in temperature ranges of from 60° C. to significantly above 200° C. Exemplary endothermic materials/systems for use according to the present disclosure include, but are not limited to those set forth in Table 3 hereinbelow.

TABLE 3

| Mineral | Chemical Formula | Approximate onset of Decomposition (° C.) |
| --- | --- | --- |
| Nesquehonite | $MgCO_3 \cdot 3H_2O$ | 70-100 |
| Gypsum | $CaSO_4 \cdot 2H_2O$ | 60-130 |
| Magnesium phosphate octahydrate | $Mg_3(PO_4)_2 \cdot 8H_2O$ | 140-150 |
| Aluminium hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Magnesium hydroxide | $Mg(OH)_2$ | 300-320 |
| Magnesium carbonate subhydrate | $MgO \cdot CO_{2(0.96)}H_2O_{(0.3)}$ | 340-350 |
| Boehmite | $AlO(OH)$ | 340-350 |
| Calcium hydroxide | $Ca(OH)_2$ | 430-450 |

These endothermic materials typically contain hydroxyl or hydrous components, possibly in combination with other carbonates or sulphates. Alternative materials include non-hydrous carbonates, sulphates and phosphates. A common example would be sodium bicarbonate which decomposes above 50° C. to give sodium carbonate, carbon dioxide and water. If a thermal event associated with a lithium ion battery does result in a temperature rise above the activation temperature for endothermic reaction(s) of the selected endothermic gas-generating material, then the disclosed endothermic materials/systems material will advantageously begin absorbing thermal energy and thereby provide both cooling as well as thermal insulation to the lithium ion battery system. The amount of energy absorption possible generally depends on the amount and type of endothermic gas-generating material incorporated into the formula, as well as the overall design/positioning of the endothermic materials/systems relative to the source of energy generation within the lithium ion battery. The exact amount of addition and type(s) of endothermic materials/systems for a given application are selected to work in concert with the insulating material such that the heat absorbed is sufficient to allow the insulating material to conduct the remaining entrapped heat to the whole of the thermal mass of the energy storage device/lithium ion battery. By distributing the heat to the whole thermal mass in a controlled manner, the temperature of the adjacent cells can be kept below the critical decomposition or ignition temperatures. However, if the heat flow through the insulating material is too large, i.e., energy conduction exceeds a threshold level, then adjacent cells will reach decomposition or ignition temperatures before the mass as a whole can dissipate the stored heat.

With these parameters in mind, the insulating materials associated with the present disclosure are designed and/or selected to be thermally stable against excessive shrinkage across the entire temperature range of a typical thermal event for lithium ion battery systems, which can reach temperatures in excess of 900° C. This insulation-related requirement is in contrast to many insulation materials that are based on low melting glass fibers, carbon fibers, or fillers which shrink extensively and even ignite at temperatures above 300° C. This insulation-related requirement also distinguishes the insulation functionality disclosed herein from intumescent materials, since the presently disclosed materials do not require design of device components to withstand expansion pressure. Thus, unlike other energy storage insulation systems using phase change materials, the endothermic materials/systems of the present disclosure are not organic and hence do not combust when exposed to oxygen at elevated temperatures. Moreover, the evolution of gas by the disclosed endothermic materials/systems, with its dual purpose of removing heat and diluting any toxic gases from the energy storage devices/lithium ion battery system, is particularly advantageous in controlling and/or avoiding thermal runaway conditions.

According to exemplary embodiments, the disclosed endothermic materials/systems desirably provide mechanical strength and stability to the energy storage device/lithium ion battery in which they are used. The disclosed endothermic materials/systems may have a high porosity, i.e., a porosity that allows the material to be slightly compressible. This can be of benefit during assembly because parts can be press fit together, resulting in a very tightly held package. This in turn provides vibrational and shock resistance desired for automotive, aerospace and industrial environments.

Of note, the mechanical properties of the disclosed endothermic materials/systems generally change if a thermal event occurs of sufficient magnitude that endothermic reaction(s) are initiated. For example, the evolution of gases associated with the endothermic reaction(s) may reduce the mechanical ability of the endothermic materials/systems to maintain the initial assembled pressure. However, energy storage devices/lithium ion batteries that experience thermal events of this magnitude will generally no longer be fit-for-service and, therefore, the change in mechanical properties can be accepted for most applications. According to exemplary implementations of the present disclosure, the evolution of gases associated with endothermic reaction(s) leaves behind a porous insulating matrix.

The gases produced by the disclosed endothermic gas-generating endothermic materials/systems include (but are not limited to) $CO_2$, $H_2O$ and/or combinations thereof. The evolution of these gases provides for a series of subsequent and/or associated functions. First, the generation of gases between an upper normal operating temperature and a higher threshold temperature above which the energy storage device/lithium ion battery is liable to uncontrolled discharge/thermal runaway can advantageously function as a means of forcing a venting system for the energy storage device/lithium ion battery to open.

The generation of the gases may serve to partially dilute any toxic and/or corrosive vapors generated during a thermal event. Once the venting system activates, the released gases also serve to carry out heat energy as they exit out of the device through the venting system. The generation of gases by the disclosed endothermic materials/systems also helps to force any toxic gases out of the energy storage device/lithium ion battery through the venting system. In addition, by diluting any gases formed during thermal runaway, the potential for ignition of the gases is reduced.

The endothermic materials/systems may be incorporated and/or implemented as part of energy storage devices/lithium ion battery systems in various ways and at various levels. For example, the disclosed endothermic materials/systems may be incorporated through processes such as dry pressing, vacuum forming, infiltration and direct injection. Moreover, the disclosed endothermic materials/systems may be positioned in one or more locations within an energy storage device/lithium ion battery so as to provide the desired temperature/energy control functions.

A preferred mechanical seal for securing a lid relative to the can/container according to the present disclosure is a double seam. Double seaming is a means of connecting a top or bottom to a sidewall of a can by a particular pattern of edge folding. Double seamed joints can withstand significant internal pressure and intimately tie the top and sidewall together, but because of the extreme bends required in the joint the two flanges to be seamed together must be sufficiently thin—for aluminum sheet, double seamed joints are possible at thicknesses of less than 0.5 mm. If the operating pressure of the cell requires a thicker lid or can, provisions must be made to ensure that the seaming flanges of these thicker members must be reduced to 0.5 mm or less of thickness to make double seaming a possible method for sealing the can.

The overall design of the sealing mechanisms and its dependency on design parameters (overall dimensions, material thickness, and mechanical properties) for the container structure are highly interdependent as they affect the mechanical response to internal pressure especially and also external loads. This in turn also affects the venting and pressure disconnect structures. Certain sealing mechanisms, such as the low cost double seam, may only be used when venting pressure is low. Other sealing mechanisms, such as laser welding, are more robust, but still are dependent on limiting pressure when the container is not constrained. Material properties and dimensions are dependent on the methods chosen to effect the sealing of the closure. These interdependencies are complex and their relationships in the design space is not intuitive. The inventors have found that certain structures are particularly useful when optimizing functionality and cost of large Li-ion cells.

One major goal is to limit the overall growth of the container dimension when subjected to normal operating conditions of the cell. This growth amount is highly dependent on the length and width of the container, the thickness of the top and the joining method of the top closure to the container wall (See FIGS. 8 through 10 for examples of the thickness impact on displacements for a fixed container dimension). For a rectangular container the larger the plan view dimensions (length and width of the lid) the thicker the lid has to be in order to meet the deformation limit at operating pressure. From the governing equations (FIG. 7) for maximum deflection of a rectangular plate subject to a pressure load the deflection is a inverse cubic relation to the thickness for fixed boundary dimensions and further the deflection is a nominally a $5^{th}$ order function of the ling dimension of the plate. This drives one to grow the lid thickness very quickly as the container dimensions change. This is undesired as weight and volume is increased. Further the stresses at the boundary decrease as the inverse of the thickness squared which will have the benefit of reducing the stresses at the most critical region of the container the sealing joint. The displacements and stresses within the lid and/or walls can also be reduced by limiting the effective span of the wall or lid through the addition of supports, either in the form of tie members connecting the lid to the bas or opposite walls to one another. These tie points will effectively shorten the a or b dimensions in the equations in FIG. 1 and thus positively impact the displacement versus pressure profile of the container (see FIG. 11). These results play well with the concept of welding the lid to the container wall, but becomes a significant design challenge to mechanically joining the lid to the container. The mechanical joining processes require the container wall and/or lid remain below a certain thickness to allow for the required mechanical deformation that mechanically locks and seals the lid to the container.

The mechanical joints (double seam and crimp among others) can require the lid and container wall to be much thinner than required to resist the operating pressure of the cell. These restrictions can be mitigated through a number of mechanical processes to alter the thickness of the material local to the joints (e.g. coining, machining, ironing, etc.). Once the thickness is reduced to facilitate the joining the newly developed stresses at the joint must be analyzed and optimized. These same issues must be further addressed and considered in the overload case where pressures are allowed to go much higher than the operating pressure. As outlined elsewhere there are 4 pressure regimes that must be considered, the operating pressure limit is governed by the deformation limits of the container in its operating environment. For the container once the pressure exits the normal cell operating limit the events are to be considered anomalous and thus new requirements are imposed on the container. Once the container exits the operating pressure regime the limits for container expansion are relaxed but now the lid to container wall joint is required to contain the pressure beyond the value set in regime 4 where the container releases the internal pressure through a venting device built into the container. In the over pressure event the stresses in the joint become the governing design feature and the potential for strength change in the HAZ of a laser welded lid must be considered as well as the strength change due to thickness reduction required to make the joint with a mechanical method. These design trade-offs are complex and non obvious and require significant understanding of materials, manufacturing processes and joining methods and those interact with one another during the manufacturing of the containers.

Example 1

A 30 mesh copper wire mesh supplied was tested successfully with a vent design to make sure that it neither tore, nor extruded through the vent when pressure was relieved. An acrylic adhesive was used to attach the mesh relative to the underside of the sheet metal in these tests. The required hole size of a flame arrestor mesh is determined by the auto-ignition temperature of the evolved gas, and its velocity.

If the pressure drop across the mesh at steady state during a vent were over the vent pressure, the gas evolution would continue to pressurize the container, even though the vent was open. This would be undesirable, but seems unlikely. The view that pressurization in such circumstances is unlikely is bolstered by experimental results at http://naca-.central.cranfield.ac.uk/reports/arc/cp/0538.pdf, which show that actual pressure drops across a similar mesh with a wool filter element in a wind tunnel at air speeds from Mach 2 to 4 were less than 1 psi.

The disclosed flame arrestor advantageously lowers the temperature of the exiting gas to below the auto-ignition temperature through heat transfer functionality Although exemplary implementations of the present disclosure employ a mesh (e.g., a 30 US mesh) to achieve the noted heat absorption, the heat transfer functionality could be accomplished by passing the gas through a fine mesh, an open cell foam, a thin tube describing a tortuous path, a long straight tube of sufficiently small diameter, or a perforated sheet. In all the cases listed in the prior sentence, the gas path obstruction must be fabricated of sufficiently conductive material that the gas temperature is lowered to below the auto-ignition temperature.

A vent having a substantially circular opening and a copper 30 mesh was mounted onto a lid of a 80 Ah cell using 23 individual jelly rolls made of graphite anodes and NMC cathodes. A second cell was tested similarly with the difference that the jelly rolls had NCA based cathodes and a capacity of 94 Ah. The container was made of Aluminum 3003-0 metal. Both cells were charged to its full capacity obtained at 4.2V. An internal short was implanted into one of the jelly roll as described by NREL. The internal short device, ISD, used was designed to short the cell when a temperature of 52° C. was reached at the ISD site. The cell was heated to above 70° C. to achieve this. Upon shorting the cell, the cell vented and the jelly roll containing the ISD device was completely burned while neighboring jelly rolls was not brought into cascading runaway, showing that the vent was effective in preventing flashback to the other jelly roll in the system.

Although the present disclosure has been described with reference to exemplary implementations, the present disclosure is not limited by or to such exemplary implementations. Rather, various modifications, refinements and/or alternative implementations may be adopted without departing from the spirit or scope of the present disclosure.

The invention claimed is:

1. A lithium ion battery, comprising:
a support member including a plurality of cavities defined by cavity surfaces, wherein each of the plurality of cavities is configured to receive a lithium ion core member through a cavity opening;

a plurality of unsealed lithium ion core members, each of the plurality of unsealed lithium ion core members (i) including an anode, a cathode, a separator positioned between the anode and the cathode, and electrolyte, and (ii) positioned in one of the plurality of cavities of the support member, a hermetically sealed enclosure that defines an internal volume and a shared atmosphere region, the hermetically sealed enclosure formed from an outer can or casing and a top cover that collectively define an outer surface of the hermetically sealed enclosure, the hermetically sealed enclosure surrounding and enclosing the support member; and a fuse positioned external to the enclosure;

wherein each of the unsealed lithium ion core members is surrounded by a cavity surface of one of the plurality of cavities along its length such that electrolyte is prevented from escaping the cavity within which it is contained;

wherein the anode, cathode and electrolyte of each unsealed lithium ion core member is open to the shared atmosphere region and communicates with the shared atmosphere region through a cavity opening when positioned in a cavity of the support member; and wherein the hermetically sealed enclosure includes a pressure disconnect device in communication with the shared atmosphere region and mounted in an opening formed in the outer surface of the hermetically sealed enclosure, the pressure disconnect device including a deflectable dome mounted within the internal volume and a hammer head mounted external to the internal volume; and wherein actuation of the pressure disconnect device based on a pressure increase within the internal volume causes an electrical short of the fuse, thereby electrically isolating unsealed lithium ion core members positioned within the enclosure.

2. The lithium ion battery of claim 1, further comprising one or more endothermic materials positioned in proximity to one or more of the unsealed lithium ion core members.

3. The lithium ion battery of claim 1, wherein the support member includes a kinetic energy absorbing material.

4. The lithium ion battery of claim 3, wherein the kinetic energy absorbing material is formed of one of aluminum foam, ceramic, ceramic fiber, and plastic.

5. The lithium ion battery of claim 1, further comprising a plurality of cavity liners, each positioned between a corresponding one of the unsealed lithium ion core members and a surface of a corresponding one of the cavities, wherein the cavity liners define polymer and metal foil laminated pouches.

6. The lithium ion battery of claim 1, further comprising a plurality of cavity liners, each positioned between a corresponding one of the unsealed lithium ion core members and a surface of a corresponding one of the cavities, wherein the cavity liners are formed of a plastic or aluminum material.

7. The lithium ion battery of claim 6, wherein the plurality of cavity liners are formed as part of a monolithic liner member.

8. The lithium ion battery of claim 1, wherein the electrolyte comprises at least one of a flame retardant, a gas generating agent, and a redox shuttle.

9. The lithium ion battery according to claim 1, further comprising one or more endothermic materials and wherein at least one of the one or more endothermic materials is included within a ceramic matrix.

10. The lithium ion battery according to claim 1, wherein the deflectable dome is configured and dimensioned to prevent burn through.

11. The lithium ion battery according to claim 10, wherein burn through is prevented by one or more of the following: (i) increasing the mass of the deflectable dome, (ii) adding material to the deflectable dome, and (iii) combinations thereof.

12. The lithium ion battery according to claim 11, wherein the increased mass of the deflectable dome or the material added to the deflectable dome is the same material from which the deflectable dome is fabricated.

13. The lithium ion battery according to claim 11, wherein the increased mass of the deflectable dome or the material added to the deflectable dome is, at least in part, a different type of material as compared to the material used to fabricate the deflectable dome.

14. The lithium ion battery according to claim 10, wherein the deflectable dome is configured and dimensioned to prevent burn through at least in part based on the speed at which the deflectable dome responds at a target trigger pressure.

15. The lithium ion battery according to claim 1, wherein electrical connection of the unsealed lithium ion core members is selected from the group consisting of: (i) parallel connection of the unsealed lithium ion core members, (ii) series connection of the unsealed lithium ion core members, and (iii) parallel connection of a first set of unsealed lithium ion core members, parallel connection of a second set of unsealed lithium ion core members, and series connection of the first set of unsealed lithium ion core members and the second set of unsealed lithium ion core members.

* * * * *